United States Patent
Hadler et al.

(10) Patent No.: US 11,225,580 B2
(45) Date of Patent: Jan. 18, 2022

(54) USING QUATERNARY AMINE ADDITIVES TO IMPROVE WATER SEPARATION

(71) Applicant: The Lubrizol Corporation, Wickliffe, OH (US)

(72) Inventors: Amelia Hadler, Shaker Heights, OH (US); Ben Faber, Cleveland Heights, OH (US); Jennifer E. Clark, Reminderville, OH (US); Britt A. Minch, Painesville Township, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

(21) Appl. No.: 16/854,231

(22) Filed: Apr. 21, 2020

(65) Prior Publication Data
US 2020/0248005 A1    Aug. 6, 2020

Related U.S. Application Data

(62) Division of application No. 15/772,940, filed as application No. PCT/US2016/056412 on Oct. 11, 2016, now Pat. No. 10,669,433.

(60) Provisional application No. 62/252,734, filed on Nov. 9, 2015.

(51) Int. Cl.
| | |
|---|---|
| *C09D 5/08* | (2006.01) |
| *C09D 163/00* | (2006.01) |
| *C09D 7/63* | (2018.01) |
| *C08K 5/1515* | (2006.01) |
| *C09D 135/02* | (2006.01) |

(52) U.S. Cl.
CPC ............ *C09D 5/084* (2013.01); *C08K 5/1515* (2013.01); *C09D 5/08* (2013.01); *C09D 7/63* (2018.01); *C09D 135/02* (2013.01); *C09D 163/00* (2013.01)

(58) Field of Classification Search
CPC . C09D 5/08; C09D 5/084; C09D 7/63; C09D 135/02; C09D 163/00; C08K 5/1515
See application file for complete search history.

(56) References Cited

U.S. PATENT DOCUMENTS

| | | | | |
|---|---|---|---|---|
| 4,171,959 A | ‡ | 10/1979 | Vartanian | C10L 1/2437 44/333 |
| 4,339,336 A | ‡ | 7/1982 | Hammond | C10M 133/58 508/26 |
| 5,681,378 A | ‡ | 10/1997 | Kerherve | C09D 5/08 106/14 |
| 10,669,433 B2 | * | 6/2020 | Hadler | C09D 5/08 |
| 2013/0133243 A1 | ‡ | 5/2013 | Roger-Gopfert | C10L 10/14 44/330 |
| 2013/0312318 A1 | ‡ | 11/2013 | Peretolchin | C10L 1/18 44/307 |
| 2014/0107002 A1 | | 4/2014 | Jones et al. | |

FOREIGN PATENT DOCUMENTS

| | | | | |
|---|---|---|---|---|
| CA | 2804322 A1 | 1/2012 | | |
| JP | 2010-053352 | 3/2010 | | |
| WO | 2006061230 A1 | 6/2006 | | |
| WO | WO-2006061230 A1 | ‡ | 6/2006 | ............ C23F 11/143 |
| WO | 2008060888 A2 | 5/2008 | | |
| WO | WO-2008060888 A2 | ‡ | 5/2008 | ............ C10L 1/2222 |
| WO | 2012177529 A1 | 12/2012 | | |
| WO | WO-2012177529 A1 | ‡ | 12/2012 | .......... C10M 133/56 |
| WO | 2014066344 A1 | 5/2014 | | |
| WO | WO-2014066344 A1 | ‡ | 5/2014 | ................ C10L 1/08 |
| WO | 2015183908 A1 | 12/2015 | | |
| WO | 2015183916 A1 | 12/2015 | | |
| WO | 2015184247 A1 | 12/2015 | | |
| WO | 2015184251 A1 | 12/2015 | | |
| WO | 2015184254 A1 | 12/2015 | | |
| WO | 2015184276 A1 | 12/2015 | | |
| WO | 2015184280 A1 | 12/2015 | | |
| WO | 2015184301 A2 | 12/2015 | | |

\* cited by examiner
‡ imported from a related application

*Primary Examiner* — Anthony J Green
(74) *Attorney, Agent, or Firm* — Christopher P. Demas; Teresan W. Gilbert

(57) ABSTRACT

The disclosed technology relates to corrosion- or rust-preventive coating compositions and methods of their use. The compositions comprise a rust preventative composition, optionally including a diluent, and a quaternary ammonium salt.

18 Claims, No Drawings

USING QUATERNARY AMINE ADDITIVES TO IMPROVE WATER SEPARATION

CROSS REFERENCE TO RELATED APPLICATION

This application is a division of U.S. Ser. No. 15/772,940 filed May 2, 2018, issued as U.S. Pat. No. 10,669,433, which was the national phase entry under 35 U.S.C. 371 of PCT/US2016/056412 filed Oct. 11, 2016, which claims the benefit of U.S. Provisional Application No. 62/252,734 filed Nov. 9, 2015.

BACKGROUND OF THE INVENTION

The disclosed technology relates to compositions containing a quaternary ammonium salt for metal-working and/or hydraulic fluids having improved water separation. In a particular embodiment, the technology relates to corrosion-preventative or rust-preventive coating compositions and methods of their use. Such coating compositions comprise a rust preventative composition, optionally including a diluent, and a quaternary ammonium salt.

A majority of rust preventives (RPs) are based on slack waxes generated from Group I refineries. Natural waxes provide an alternative to Group I slack waxes in rust preventives, and natural wax-based RPs can offer improved salt spray protection, among other features. However, the applications for natural wax-based RPs are limited by their poor ability to separate water. Good water separation is a necessary feature for RPs which are applied in dip tanks, to prevent the solvent-based RP from becoming diluted by carryover water from previous washing or machining processes.

There is a need to find additives that can be used to improve the water separation properties of metal working fluids as well as hydraulic fluids without compromising other key performance factors. As previously mentioned, new experimental formulations based on natural waxes suffer from poor water separation properties, but commercially available RPs, have similar issues with water separation.

SUMMARY OF THE INVENTION

Demulsifying additives, including several quaternary amine structures, were tested in an oxidized petroleum wax based rust preventative and two naturally derived wax based RPs. The quaternary amine additives were shown to improve water separation times in all three RPs to below 15 minutes, and in some cases, water separation was improved to less than 10 minutes. In addition, when used in sufficiently low concentrations, the additives had no negative effects on key performance properties like corrosion protection as measured by ASTM B117 salt spray.

In one aspect therefore, the disclosed technology solves the problem of water separation in rust preventative additives by employing quaternary ammonium salts as demulsifying agents. Provided is a coating composition comprising, consisting of, or consisting essentially of, a rust preventative, and the quaternary ammonium salt.

In an embodiment, the quaternary ammonium salt can include the reaction product of (a) a quaternizeable compound, and (b) a quaternizing agent suitable for quaternizing the quaternizeable compound. The quaternizeable compound can be the reaction product of: (i) a hydrocarbyl-substituted acylating agent, and (ii) a nitrogen containing compound having a quaternizeable amino group. The quaternizing agent must be suitable for converting the quaternizable amino group of the nitrogen containing compound to a quaternary nitrogen In an embodiment the hydrocarbyl-substituted acylating agent can be polyisobutenyl succinic anhydride or polyisobutenyl succinic acid. In a further embodiment, the hydrocarbyl-substituent can be a polyisobutylene having a molecular weight of from about 100 to about 5000.

In an embodiment, the nitrogen containing compound can have an oxygen or nitrogen atom capable of reacting with said hydrocarbyl-substituted acylating agent, and further having at least one quaternizable amino group.

In another embodiment, the nitrogen containing compound can have a nitrogen atom capable of reacting with said hydrocarbyl-substituted acylating agent to form an imide, and further having at least one quaternizable amino group.

In a further embodiment, the nitrogen containing compound can have an oxygen or nitrogen atom capable of reacting with said hydrocarbyl-substituted acylating agent to form an ester or amide, and further having at least one quaternizable amino group.

In an embodiment, the quaternizable amino group of the nitrogen containing compound having an oxygen or nitrogen atom capable of reacting with said hydrocarbyl-substituted acylating agent can be a primary, secondary or tertiary amino group.

In a still further embodiment, the nitrogen containing compound can be a tertiary amino group containing imidazole compound of formula:

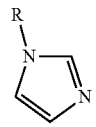

imidazole wherein R is an amine or alkanol capable of condensing with said hydrocarbyl-substituted acylating agent and having from 3 to 8 carbon atoms.

In an embodiment, the nitrogen containing compound can be either of the formulas below;

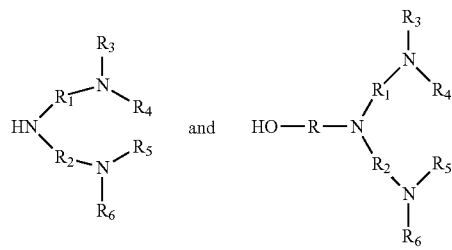

wherein each R1 and R2, individually, is a C1 to C6 hydrocarbyl group, R is a C1 to C6 alkyl group, and each of R3, R4, R5, and R6, individually, is a hydrogen or a C1 to C6 hydrocarbyl group.

In an embodiment, the quaternizing agent is capable of coupling more than one quaternizeable compounds of (a). In a further embodiment, the ratio of the compound of (a) to the quaternizing agent of (b) is from about 2:1 to about 1:1.

In some embodiments, the quaternizing agent can be chosen from polyepoxides, polyhalides, epoxy halides, aromatic polyesters, and mixtures thereof. In an embodiment, the quaternizing agent can be chosen from di-epoxides or alkyl di-halides. In other embodiments, the quaternizing agent can be chosen from 1,4 butanediol diglycidylether or bisphenol-A-diglycidylether.

In embodiments, the quaternizing agent can be at least one alcohol functionalized epoxide, C4 to C14 epoxides, or mixture thereof. In particular embodiments, the quaternizing agent can be glycidol. In further embodiments, the quaternizing agent can be epoxyhexadecane. In still further embodiments, the quaternizing agent can be butylene oxide.

In some embodiments, the quaternizing agent can be employed in the presence of a protic solvent. In some embodiments, the protic solvent can be 2-ethylhexanol, water, and mixtures thereof.

In embodiments, the quaternizing agent can be employed in the presence of an acid. In particular embodiments, the acid can be present in the structure of the acylating agent.

In embodiments, the quaternizing agent can be chosen from dialkyl sulfates, alkyl halides, hydrocarbyl substituted carbonates, hydrocarbyl epoxides, carboxylates, alkyl esters and mixtures thereof.

The coating composition can also contain at least one other additive beside the rust preventative and quaternary ammonium salt. In an embodiment, the at least one other additive can be at least one non-quaternized hydrocarbyl-substituted succinic acid.

One aspect of the technology described herein includes a method of providing rust prevention to a metal surface by applying to the metal surface a rust preventative composition as disclosed.

Another aspect of the technology includes the use of a quaternary ammonium salt as disclosed herein to provide water separation for a coating composition comprising a rust preventative composition.

DETAILED DESCRIPTION OF THE INVENTION

Various preferred features and embodiments will be described below by way of non-limiting illustration.

An aspect of the disclosed technology relates to a coating composition for protection of metal surfaces, especially ferrous surfaces. In an embodiment, the coating composition can be a metal working fluid. Metalworking fluids include, for example, rust preventative coating compositions for rust protection applications on metal surfaces. Metalworking fluids can also include straight oil metal working applications such as metal processing fluids. The coating composition can comprise, consist essentially of, or consist of a rust preventative composition and a quaternary ammonium salt.

Quaternary Ammonium Salt

The production of a quaternary ammonium salt generally results in a mixture of compounds including a quaternary ammonium salt or salts, and this mixture may be difficult to define apart from the process steps employed to produce the quaternary ammonium salt. Further, the process by which a quaternary ammonium salt is produced can be influential in imparting distinctive structural characteristics to the final quaternary ammonium salt product that can affect the properties of the quaternary ammonium salt product. Thus, in one embodiment, the quaternary ammonium salts of the present technology may be described as a reaction product of (a) a quaternizeable compound, and (b) a quaternizing agent. As used herein, reference to quaternary ammonium salt includes reference to the mixture compounds including a quaternary ammonium salt or salts as described herein, as well as referring to the quaternary ammonium salt itself.

The quaternizable compound of (a) employed to prepare the quaternary ammonium salt may itself be the reaction product of (i) a hydrocarbyl-substituted acylating agent, and (ii) a nitrogen containing compound. More particularly, the hydrocarbyl-substituted acylating agent of (a)(i) can consist of an acylating agent functionalized with a hydrocarbyl-substituent having a number average molecular weight of from about 100 to about 5000, or from 300 to about 3000, or from 500 to 2500, and in an embodiment, from about 300 to about 750, or from about 1300 to about 3000.

Examples of quaternary ammonium salts and methods for preparing the same are described in the following patents, which are hereby incorporated by reference, U.S. Pat. Nos. 4,253,980, 3,778,371, 4,171,959, 4,326,973, 4,338,206, 5,254,138, and 7,951,211.

Details regarding the quaternizeable compound, and specifically, the hydrocarbyl-substituted acylating agent and the nitrogen containing compound, as well as the quaternizing agent, are provided below.

The Hydrocarbyl Substituted Acylating Agent

The hydrocarbyl substituted acylating agent employed to prepare the quaternizeable compound can be the reaction product of the precursor to the hydrocarbyl-substituent, which is a long chain hydrocarbon, generally a polyolefin, with a monounsaturated carboxylic acid reactant such as (i) α,β-monounsaturated $C_4$ to $C_{10}$ dicarboxylic acid such as fumaric acid, itaconic acid, maleic acid; (ii) derivatives of (i) such as anhydrides or $C_1$ to $C_5$ alcohol derived mono- or di-esters of (i); (iii) α,β-monounsaturated $C_3$ to $C_{10}$ monocarboxylic acid such as acrylic acid and methacrylic acid; or (iv) derivatives of (iii) such as $C_1$ to $C_5$ alcohol derived esters of (iii).

The hydrocarbyl-substituent is a long chain hydrocarbyl group. In one embodiment, the hydrocarbyl group can have a number average molecular weight (Mn) of from about 1300 to about 3000. The Mn of the hydrocarbyl-substituent can also be from about 1500 to about 2800 or 2900, or from about 1700 to about 2700, or from about 1900 to about 2600, or about 2000 to about 2500. In an embodiment, the hydrocarbyl-substituent can be any compound containing an olefinic bond represented by the general formula:

$$(R^1)(R^2)C=C(R^6)(CH(R^7)(R^8))\qquad(I)$$

wherein each of $R^1$ and $R^2$ is, independently, hydrogen or a hydrocarbon based group. Each of $R^6$, $R^7$ and $R^8$ is, independently, hydrogen or a hydrocarbon based group; preferably at least one is a hydrocarbon based group containing at least 20 carbon atoms.

Olefin polymers for reaction with the monounsaturated carboxylic acids can include polymers comprising a major molar amount of $C_2$ to $C_{20}$, e.g. $C_2$ to $C_5$ monoolefin. Such olefins include ethylene, propylene, butylene, isobutylene, pentene, octene-1, or styrene. The polymers can be homopolymers such as polyisobutylene, as well as copolymers of two or more of such olefins such as copolymers of; ethylene and propylene; butylene and isobutylene; propylene and isobutylene. Other copolymers include those in which a minor molar amount of the copolymer monomers e.g., 1 to 10 mole % is a $C_4$ to $C_{18}$ diolefin, e.g., a copolymer of isobutylene and butadiene; or a copolymer of ethylene, propylene and 1,4-hexadiene.

In one embodiment, at least one R of formula (I) is derived from polybutene, that is, polymers of C4 olefins, including 1-butene, 2-butene and isobutylene. C4 polymers can include polyisobutylene. In another embodiment, at least one R of formula (I) is derived from ethylene-alpha olefin polymers, including ethylene-propylene-diene polymers. Ethylene-alpha olefin copolymers and ethylene-lower olefin-diene terpolymers are described in numerous patent documents, including European patent publication EP 0 279 863 and the following United States patents: U.S. Pat. Nos. 3,598,738; 4,026,809; 4,032,700; 4,137,185; 4,156,061; 4,320,019; 4,357,250; 4,658,078; 4,668,834; 4,937,299; 5,324,800 each of which are incorporated herein by reference for relevant disclosures of these ethylene based polymers.

In another embodiment, the olefinic bonds of formula (I) are predominantly vinylidene groups, represented by the following formulas:

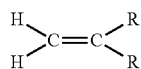

(II)

wherein R is a hydrocarbyl group

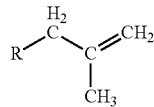

(III)

wherein R is a hydrocarbyl group.

In one embodiment, the vinylidene content of formula (I) can comprise at least about 30 mole % vinylidene groups, at least about 50 mole % vinylidene groups, or at least about 70 mole % vinylidene groups. Such material and methods for preparing them are described in U.S. Pat. Nos. 5,071,919; 5,137,978; 5,137,980; 5,286,823, 5,408,018, 6,562,913, 6,683,138, 7,037,999 and U.S. Publication Nos. 20040176552A1, 20050137363 and 20060079652A1, which are expressly incorporated herein by reference, such products are commercially available by BASF, under the tradename GLISSOPAL® and by Texas PetroChemical LP, under the tradename TPC 1105™ and TPC 595™.

Methods of making hydrocarbyl substituted acylating agents from the reaction of the monounsaturated carboxylic acid reactant and the compound of formula (I) are well known in the art and disclosed in the following patents: U.S. Pat. Nos. 3,361,673 and 3,401,118 to cause a thermal "ene" reaction to take place; U.S. Pat. Nos. 3,087,436; 3,172,892; 3,272,746, 3,215,707; 3,231,587; 3,912,764; 4,110,349; 4,234,435; 6,077,909; 6,165,235 and are hereby incorporated by reference.

In another embodiment, the hydrocarbyl substituted acylating agent can be made from the reaction of at least one carboxylic reactant represented by the following formulas:

$(R^3C(O)(R^4)_nC(O))R^5$ (IV)

and

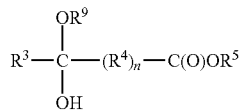

(V)

wherein each of $R^3$, $R^5$ and $R^9$ is independently H or a hydrocarbyl group, $R^4$ is a divalent hydrocarbylene group and n is 0 or 1 with any compound containing an olefin bond as represented by formula (I). Compounds and the processes for making these compounds are disclosed in U.S. Pat. Nos. 5,739,356; 5,777,142; 5,786,490; 5,856,524; 6,020,500; and 6,114,547.

In yet another embodiment, the hydrocarbyl substituted acylating agent can be made from the reaction of any compound represented by formula (I) with (IV) or (V), and can be carried out in the presence of at least one aldehyde or ketone. Suitable aldehydes include formaldehyde, acetaldehyde, propionaldehyde, butyraldehyde, isobutyraldehyde, pentanal, hexanal. heptaldehyde, octanal, benzaldehyde, and higher aldehydes. Other aldehydes, such as dialdehydes, especially glyoxal, are useful, although monoaldehydes are generally preferred. In one embodiment, aldehyde is formaldehyde, which can be supplied as the aqueous solution often referred to as formalin, but is more often used in the polymeric form as paraformaldehyde, which is a reactive equivalent of, or a source of, formaldehyde. Other reactive equivalents include hydrates or cyclic trimers. Suitable ketones include acetone, butanone, methyl ethyl ketone, and other ketones. Preferably, one of the two hydrocarbyl groups is methyl. Mixtures of two or more aldehydes and/or ketones are also useful.

Compounds and the processes for making these compounds are disclosed in U.S. Pat. Nos. 5,840,920; 6,147,036; and 6,207,839.

In another embodiment, the hydrocarbyl substituted acylating agent can include, methylene bis-phenol alkanoic acid compounds, the condensation product of (i) aromatic compound of the formula:

$R_m$—Ar—$Z_c$ (VI)

wherein R is independently a hydrocarbyl group, Ar is an aromatic group containing from 5 to about 30 carbon atoms and from 0 to 3 optional substituents such as amino, hydroxy- or alkyl-polyoxyalkyl, nitro, aminoalkyl, carboxy or combinations of two or more of said optional substituents, Z is independently OH, lower alkoxy, $(OR^{10})_bOR^{11}$, or O— wherein each $R^{10}$ is independently a divalent hydrocarbyl group, $R^{11}$ is H or hydrocarbyl and b is a number ranging from 1 to about 30. c is a number ranging from 1 to about 3 and m is 0 or an integer from 1 up to about 6 with the proviso that m does not exceed the number of valences of the corresponding Ar available for substitution and (ii) at least on carboxylic reactant such as the compounds of formula (IV) and (V) described above. In one embodiment, at least one hydrocarbyl group on the aromatic moiety is derived from polybutene. In one embodiment, the source of hydrocarbyl groups are above described polybutenes obtained by polymerization of isobutylene in the presence of a Lewis acid catalyst such as aluminum trichloride or boron trifluoride.

Compounds and the processes for making these compounds are disclosed in U.S. Pat. Nos. 3,954,808; 5,336,278; 5,458,793; 5,620,949; 5,827,805; and 6,001,781.

In another embodiment, the reaction of (i) with (ii), optionally in the presence of an acidic catalyst such as organic sulfonic acids, heteropolyacids, and mineral acids, can be carried out in the presence of at least one aldehyde or ketone. The aldehyde or ketone reactant employed in this embodiment is the same as those described above. The ratio of the hydroxyaromatic compound: carboxylic reactant: aldehyde or ketone can be 2:(0.1 to 1.5):(1.9 to 0.5). In one embodiment, the ratio is 2:(0.8 to 1.1):(1.2 to 0.9). The amounts of the materials fed to the reaction mixture will normally approximate these ratios, although corrections may need to be made to compensate for greater or lesser reactivity of one component or another, in order to arrive at a reaction product with the desired ratio of monomers. Such corrections will be apparent to the person skilled in the art. While the three reactants can be reacted simultaneously to form the product, it is also possible to conduct the reaction sequentially, whereby the hydroxyaromatic is reacted first with either the carboxylic reactant and thereafter with the aldehyde or ketone, or vice versa. Compounds and the processes for making these compounds are disclosed in U.S. Pat. No. 5,620,949.

Other methods of making the hydrocarbyl substituted acylating agent can be found in the following reference, U.S. Pat. Nos. 5,912,213; 5,851,966; and 5,885,944 which are hereby incorporated by reference.

Nitrogen Containing Compound

The composition of the present invention contains a nitrogen containing compound. In some embodiment, the quaternary ammonium salt can be an imide containing quaternary ammonium salt, in which case the nitrogen containing compound has a nitrogen atom capable of reacting with the acylating agent and further has a quaternizeable amino group. In some embodiments, the quaternary ammonium salt can be an amide or ester containing quaternary ammonium salt, in which case the nitrogen containing compound can have an oxygen or a nitrogen atom capable of reacting with the acylating agent and further having a quaternizable amino group. In an embodiment, the nitrogen containing compound can be free of oxygen atoms. A quaternizable amino group is any primary, secondary or tertiary amino group on the nitrogen containing compound that is available to react with a quaternizing agent to become a quaternary amino group.

In one embodiment, the nitrogen containing compound can be represented by the following formulas:

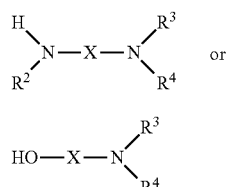

(VII)

(VIII)

wherein X is an alkylene group containing about 1 to about 4 carbon atoms; R2, R3 and R4 are hydrocarbyl groups.

Examples of the nitrogen containing compound capable of reacting with the acylating agent can include but is not limited to: dimethylaminopropylamine, N,N-dimethyl-aminopropylamine, N,N-diethyl-aminopropylamine, N,N-dimethyl-aminoethylamine ethylenediamine, 1,2-propylenediamine, 1,3-propylene diamine, the isomeric butylenediamines, pentanediamines, hexanediamines, heptanediamines, diethylenetriamine, dipropylenetriamine, dibutylenetriamine, triethylenetetraamine, tetraethylenepentaamine, pentaethylenehexaamine, hexamethylenetetramine, and bis(hexamethylene) triamine, the diaminobenzenes, the diaminopyridines or mixtures thereof. The nitrogen containing compounds capable of reacting with the acylating agent and further having a quaternizable amino group can further include aminoalkyl substituted heterocyclic compounds such as 1-(3-aminopropyl)imidazole and 4-(3-aminopropyl)morpholine, 1-(2-aminoethyl)piperidine, 3,3-diamino-N-methyldipropylamine, 3'3-aminobis(N,N-dimethylpropylamine). Additional nitrogen containing compounds capable of reacting with the acylating agent and having a quaternizable amino group include alkanolamines including but not limited to triethanolamine, trimethanolamine, N,N-dimethylaminopropanol, N,N-diethylaminopropanol, N,N-diethyl aminobutanol, N,N,N-tris(hydroxyethyl)amine, N,N,N-tris(hydroxymethyl)amine, N—N-dimethylethanolamine, N—N-diethylethanolamine, 2-(diisopropylamino)ethanol, 2-(dibutylamino)ethanol, 3-dimethylamino-1-propanol, 3-diethylamino-1-propanol, 1-dimethylamino-2-propanol, 1-diethylamino-2-propanol, 2-dimethylamino-2-methyl-1-1propanol, 5-dimethyl amino-2-propanol, 2-[2-(dimethylamino)ethoxy]-ethanol, 4-methyl-2-{piperidinomethyl}phenol, 1-b enzyl-3-pyrrolidinol, 1-benzylpyrrolidine-2-methanol, 2,4,6-tri(dimethylaminomethyl)phenol, dialkoxylated amines such as Ethermeen T12. In some embodiments, the nitrogen containing compound excludes dimethylaminopropylamine.

In one embodiment, the nitrogen containing compound can be an imidazole, for example, as represented by the following formula:

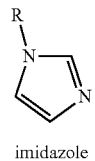

(IX)

imidazole wherein R is an amine or alkanol capable of condensing with said hydrocarbyl-substituted acylating agent and having from 3 to 8 carbon atoms In one embodiment, the nitrogen containing compound can be represented by at least one of formulas X or XI:

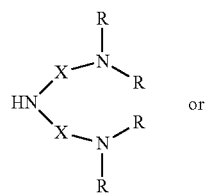

(X)

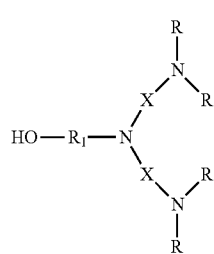

(XI)

wherein each X can be, individually, a C1 to C6 hydrocarbyl group, $R_1$ is a C1 to C6 alkyl group, and each R can be, individually, a hydrogen or a C1 to C6 hydrocarbyl group. In one embodiment, X can be, for example, a C1, C2 or C3 alkyl group. In some embodiments, $R_1$ can be, for example, a C1, C2 or C3 alkyl group.

In the same or different embodiments, each R can be, for example, H or a C1, C2 or C3 alkyl group.

Quaternizeable Compound

The hydrocarbyl substituted acylating agents and nitrogen containing compounds described above are reacted together to form a quaternizeable compound. Methods and process for reacting the hydrocarbyl substituted acylating agents and nitrogen containing compounds are well known in the art.

In embodiments, the reaction between the hydrocarbyl substituted acylating agents and nitrogen containing compounds can be carried out at temperatures of greater than about 80° C., or 90° C., or in some cases 100° C., such as between about 100 and about 150 or 200° C., or about 125 and 175° C. Such reaction temperatures are particularly suitable for preparing imide compounds, but are not limited thereto. At the foregoing temperatures water may be produced during the condensation, which is referred to herein as the water of reaction. In some embodiments, the water of reaction can be removed during the reaction, such that the water of reaction does not return to the reaction and further react.

In embodiments, the reaction between the hydrocarbyl substituted acylating agents and nitrogen containing compounds can be carried out at temperatures of less than about 80° C., such as between about 30 and about 70 or 75° C., or about 40 and about 60° C. Such reaction temperatures are particularly suitable for preparing amide or ester compounds, but are not limited thereto.

The hydrocarbyl substituted acylating agents and nitrogen containing compounds may be reacted at a ratio of 1:1, but the reaction may also containing the respective reactants (i.e., hydrocarbyl substituted acylating agent:nitrogen containing compound) from about 3:1 to about 1:1.2, or from about 2.5:1 to about 1:1.1, and in some embodiments from about 2:1 to about 1:1.05.

Quaternizing Agent

The quaternary ammonium salt can be formed when the quaternizeable compound, that is, the reaction products of the hydrocarbyl substituted acylating agent and nitrogen containing compounds described above, are reacted with a quaternizing agent. Suitable quaternizing agents can include, for example, dialkyl sulfates, alkyl halides, hydrocarbyl substituted carbonates; hydrocarbyl epoxides, carboxylates, alkyl esters, and mixtures thereof.

In one embodiment, the quaternizing agent can include alkyl halides, such as chlorides, iodides or bromides; alkyl sulfonates; dialkyl sulfates, such as, dimethyl sulfate and diethyl sulfate; sultones; alkyl phosphates; such as, C1-12 trialkylphosphates; di C1-12 alkylphosphates; borates; C1-12 alkyl borates; alkyl nitrites; alkyl nitrates; dialkyl carbonates, such as dimethyl oxalate; alkyl alkanoates, such as methylsalicylate; O,O-di-C1-12 alkyldithiophosphates; or mixtures thereof.

In one embodiment, the quaternizing agent may be derived from dialkyl sulfates such as dimethyl sulfate or diethyl sulfate, N-oxides, sultones such as propane and butane sultone; alkyl, acyl or aryl halides such as methyl and ethyl chloride, bromide or iodide or benzyl chloride, and a hydrocarbyl (or alkyl) substituted carbonates. If the alkyl halide is benzyl chloride, the aromatic ring is optionally further substituted with alkyl or alkenyl groups.

The hydrocarbyl (or alkyl) groups of the hydrocarbyl substituted carbonates may contain 1 to 50, 1 to 20, 1 to 10 or 1 to 5 carbon atoms per group. In one embodiment, the hydrocarbyl substituted carbonates contain two hydrocarbyl groups that may be the same or different. Examples of suitable hydrocarbyl substituted carbonates include dimethyl or diethyl carbonate.

In another embodiment, the quaternizing agent can be a hydrocarbyl epoxide, for example, as represented by the following formula:

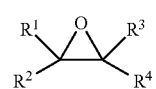

(XII)

wherein $R^1$, $R^2$, $R^3$ and $R^4$ can be independently H or a hydrocarbyl group contain from 1 to 50 carbon atoms. Examples of hydrocarbyl epoxides include: ethylene oxide, propylene oxide, butylene oxide, styrene oxide and combinations thereof. In one embodiment the quaternizing agent does not contain any styrene oxide.

In some embodiments, the hydrocarbyl epoxide can be an alcohol functionalized epoxide, C4 to C14 epoxides, and mixtures thereof.

Exemplary C4 to C14 epoxides are those of formula XII where $R^1$, $R^2$, $R^3$ and $R^4$ can be independently H or a C2 to C12 hydrocarbyl group. In an embodiment, the epoxides can be C4 to C14 epoxides. Epoxides suitable as quaternizing agents in the present technology can include, for example, C4 to C14 epoxides having linear hydrocarbyl substituents, such as, for example, 2-ethyloxirane, 2-propyloxirane, and the like, and C4 to C14 epoxides having branched and cyclic or aromatic substituents, such as, for example, styrene oxide. C4 to C14 epoxides can also include epoxidized tri-glycerides, fats or oils; epoxidized alkyl esters of fatty acids; and mixtures thereof.

Exemplary alcohol functionalized epoxides can include those of formula XII where $R^1$, $R^2$, $R^3$ and $R^4$ can be independently H or a hydroxyl containing hydrocarbyl group. In an embodiment, hydroxyl containing hydrocarbyl group can contain from 2 to 32, or from 3 to 28, or even from 3 to 24 carbon atoms. Exemplary alcohol functionalized epoxide derivatives can include for example, glycidol and the like.

In some embodiments the hydrocarbyl epoxide can be employed in combination with an acid. The acid used with the hydrocarbyl epoxide may be a separate component, such as acetic acid. In other embodiments, a small amount of an acid component may be present, but at <0.2 or even <0.1 moles of acid per mole of hydrocarbyl acylating agent. These acids may also be used with the other quaternizing agents described above, including the hydrocarbyl substituted carbonates and related materials described below.

In some embodiments the quaternizing agent does not contain any substituent group that contains more than 20 carbon atoms.

In another embodiment the quaternizing agent can be an ester of a carboxylic acid capable of reacting with a tertiary amine to form a quaternary ammonium salt, or an ester of a polycarboxylic acid. In a general sense such materials may be described as compounds having the structure:

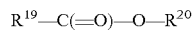

(XIII)

where $R^{19}$ is an optionally substituted alkyl, alkenyl, aryl or alkylaryl group and $R^{20}$ is a hydrocarbyl group containing from 1 to 22 carbon atoms.

Suitable compounds include esters of carboxylic acids having a pKa of 3.5 or less. In some embodiments the compound is an ester of a carboxylic acid selected from a substituted aromatic carboxylic acid, an α-hydroxycarboxylic acid and a polycarboxylic acid. In some embodiments the compound is an ester of a substituted aromatic carboxylic acid and thus $R^{19}$ is a substituted aryl group. R may be a substituted aryl group having 6 to 10 carbon atoms, a phenyl group, or a naphthyl group. R may be suitably substituted with one or more groups selected from carboalkoxy, nitro, cyano, hydroxy, SR' or NR'R" where each of R' and R" may independently be hydrogen, or an optionally substituted alkyl, alkenyl, aryl or carboalkoxy groups. In some embodiments R' and R" are each independently hydrogen or an optionally substituted alkyl group containing from 1 to 22, 1 to 16, 1 to 10, or even 1 to 4 carbon atoms.

In some embodiments $R^{19}$ in the formula above is an aryl group substituted with one or more groups selected from hydroxyl, carboalkoxy, nitro, cyano and $NH^2$. $R^{19}$ may be a poly-substituted aryl group, for example trihydroxyphenyl, but may also be a mono-substituted aryl group, for example an ortho substituted aryl group. $R^{19}$ may be substituted with a group selected from OH, $NH_2$, $NO_2$, or COOMe. Suitably $R^{19}$ is a hydroxy substituted aryl group. In some embodiments $R^{19}$ is a 2-hydroxyphenyl group. $R^{20}$ may be an alkyl or alkylaryl group, for example an alkyl or alkylaryl group containing from 1 to 16 carbon atoms, or from 1 to 10, or 1 to 8 carbon atoms. $R^{20}$ may be methyl, ethyl, propyl, butyl, pentyl, benzyl or an isomer thereof. In some embodiments $R^{20}$ is benzyl or methyl. In some embodiments the quaternizing agent is methyl salicylate. In some embodiments the quaternizing agent excludes methyl salicylate.

In some embodiments the quaternizing agent is an ester of an alpha-hydroxycarboxylic acid. Compounds of this type suitable for use herein are described in EP 1254889. Examples of suitable compounds which contain the residue of an alpha-hydroxycarboxylic acid include (i) methyl-, ethyl-, propyl-, butyl-, pentyl-, hexyl-, benzyl-, phenyl-, and allyl esters of 2-hydroxyisobutyric acid; (ii) methyl-, ethyl-, propyl-, butyl-, pentyl-, hexyl-, benzyl-, phenyl-, and allyl esters of 2-hydroxy-2-methylbutyric acid; (iii) methyl-, ethyl-, propyl-, butyl-, pentyl-, hexyl-, benzyl-, phenyl-, and allyl esters of 2-hydroxy-2-ethylbutyric acid; (iv) methyl-, ethyl-, propyl-, butyl-, pentyl-, hexyl-, benzyl-, phenyl-, and allyl esters of lactic acid; and (v) methyl-, ethyl-, propyl-, butyl-, pentyl-, hexyl-, allyl-, benzyl-, and phenyl esters of glycolic acid. In some embodiments the quaternizing agent comprises methyl 2-hydroxyisobutyrate.

In some embodiments the quaternizing agent comprises an ester of a polycarboxylic acid. In this definition we mean to include dicarboxylic acids and carboxylic acids having more than 2 acidic moieties. In some embodiments the esters are alkyl esters with alkyl groups that contain from 1 to 4 carbon atoms. Suitable example include diesters of oxalic acid, diesters of phthalic acid, diesters of maleic acid, diesters of malonic acid or diesters or triesters of citric acid.

In some embodiments the quaternizing agent is an ester of a carboxylic acid having a pKa of less than 3.5. In such embodiments in which the compound includes more than one acid group, we mean to refer to the first dissociation constant. The quaternizing agent may be selected from an ester of a carboxylic acid selected from one or more of oxalic acid, phthalic acid, salicylic acid, maleic acid, malonic acid, citric acid, nitrobenzoic acid, aminobenzoic acid and 2,4,6-trihydroxybenzoic acid. In some embodiments the quaternizing agent includes dimethyl oxalate, a terephthalate, such as dimethyl terephthalate, and methyl 2-nitrobenzoate.

Quaternizing agents capable of coupling more than one quaternizeable compound also may be employed. By "coupling" more than one quaternizeable compounds, it is meant that at least two quaternizeable compounds react with the same quaternizing agent to form a compound of the at least two quaternizeable compounds linked by the quaternizing agent. Such quaternizing agents may, in some instances, also be referred to as coupling quaternizing agents herein and can include, for example, polyepoxides, such as, for example, di-, tri-, or higher epoxides; polyhalides; epoxy-halides, aromatic polyesters, and mixtures thereof.

In one embodiment, the quaternizing agent can be a polyepoxide. Polyepoxides can include, for example, polyglycidyls which can include, for example, di-epoxyoctane; ethylene glycol diglycidyl ether; neopentyl glycol digycidyl ether; 1,4-butanediol diglycidyl ether; 3(bis(glycidyl oxymethyl)-methoxy)-1,2-propanediol; 1,4-cyclohexane dimethanol digylicidyl ether; diepoxycyclo-octane, bisphenol A diglycidyl ether 4-vinyl-1-cyclohexene diepoxide; N,N-Diglycidyl-4-4glycidyloxyaniline; 1,6-hexane diglycidyl ether; trimethylolpropanetriglycidyl ether; polypropyleneglycol diglycidyl ether; polyepoxidized tri-glycerides, fats or oils; and mixtures thereof.

In one embodiment, the quaternizing agent may be derived from polyhalides, such as, for example, chlorides, iodides or bromides. Such polyhalides can include, but not be limited to, 1,5-dibromopentane; 1,4-diiodobutane; 1,5-dichloropentane; 1,12-dichlorododecane; 1,12-dibromododecane; 1,2-diiodoethane; 1,2-dibromoethane; and mixtures thereof.

In an embodiment, the quaternizing agent can be an epoxy-halide, such as, for example, epichlorohydrin and the like.

The quaternizing agent may also be a poly aromatic ester. Examples of poly aromatic esters can include, but not be limited to, 4,4'-oxybis(methylbenzoate); dimethylterephthalate; and mixtures thereof.

In certain embodiments the molar ratio of the quaternizeable compound to quaternizing agent is 1:0.1 to 2, or 1:1 to 1.5, or 1:1 to 1.3. In some embodiments, particularly when employing a coupling quaternizing agent, the ratio of the quaternizeable compound to the quaternizing agent can be from about 2:1 to about 1:1.

Any of the quaternizing agents described above, including the hydrocarbyl epoxides, may be used in combination with an acid. Suitable acids include carboxylic acids, such as acetic acid, propionic acid, 2-ethylhexanoic acid, and the like.

In some embodiments, the quaternizing agent can be employed in the presence of a protic solvent, such as, for example, 2-ethylhexanol, water, and combinations thereof. In some embodiments, the quaternizing agent can be employed in the presence of an acid. In some embodiments, the acid can be an acid component in addition to the acid group present in the structure of the acylating agent. In further embodiments the reaction can be free of, or essentially free of, any additional acid component other than the acid group present in the structure of the acylating agent. By "free of" it is meant completely free, and by "essentially free" it is meant an amount that not materially affect the essential or basic and novel characteristics of the composition, such as, for example, less than 1% by weight.

Structure

While the process to prepare the quaternary ammonium salts can produce a mixture that is not readily definable apart from the process steps, certain structural components may be expected in some circumstances.

In some embodiments the quaternary ammonium salt can comprise, consist essentially of, or consist of a cation represented by the following formula:

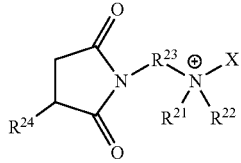

(XIV)

wherein: $R^{21}$ is a hydrocarbyl group containing from 1 to 10 carbon atoms; $R^{22}$ is a hydrocarbyl group containing from 1 to 10 carbon atoms; $R^{23}$ is a hydrocarbylene group containing from 1 to 20 carbon atoms; $R^{24}$ is a hydrocarbyl group containing from 5 to 400 carbon atoms, or from 15 or 25 to 300 or 350 carbon atoms, or from 50 or 120 to 250 carbon atoms, or from 135 to 200 carbon atoms; and X is a group derived from the quaternizing agent. In some embodiments, $R^{24}$ can be a hydrocarbyl group containing from 92 to 215 carbon atoms, or from 107 to 200 or 210 carbon atoms, or from 120 to 195 carbon atoms, or from 135 to 190 or from 140 to 180 or 185 carbon atoms, or a hydrocarbyl group containing from 20 to 55 carbon atoms, or from 25 to 50, or from 28 to 43 or 47 carbon atoms.

In some embodiments the quaternary ammonium salt can comprise, consist essentially of, or consist of a cation represented by the following formula:

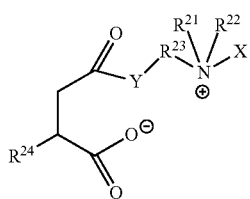

(XV)

wherein: $R^{21}$ and $R^{22}$ are hydrocarbyl groups containing from 1 to 10 carbon atoms; $R^{23}$ is a hydrocarbylene group containing from 1 to 20 carbon atoms; $R^{24}$ is a hydrocarbyl group containing from 5 to 400 carbon atoms, or from 15 or 25 to 300 or 350 carbon atoms, or from 50 or 120 to 250 carbon atoms, or from 135 to 200 carbon atoms; X is a group derived from the quaternizing agent; and Y is oxygen or nitrogen. In some embodiments, $R^{24}$ can be a hydrocarbyl group containing from 92 to 215 carbon atoms, or from 107 to 200 or 210 carbon atoms, or from 120 to 195 carbon atoms, or from 135 to 190 or from 140 to 180 or 185 carbon atoms, or a hydrocarbyl group containing from 20 to 55 carbon atoms, or from 25 to 50, or from 28 to 43 or 47 carbon atoms.

In some embodiments the quaternary ammonium salt can comprise, consist essentially of, or consist of a cation represented by the following formulas:

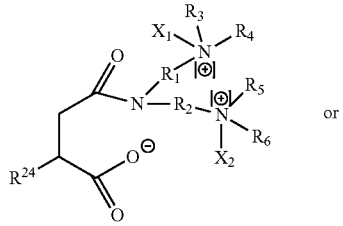

(XVI)

or

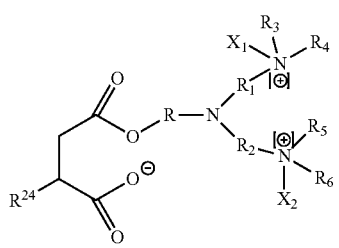

(XVII)

wherein: R can be a C1 to C6 alkyl group; R1 and R2, individually, can be a C1 to C6 hydrocarbyl group, for example a C1, C2, or C3 alkyl group; R3, R4, R5 and R6, individual, can be hydrogen or a C1 to C6 hydrocarbyl group, such as, for example, a C1, C2, or C3 alkyl group; $R^{24}$ is a hydrocarbyl group containing from 5 to 400 carbon atoms, or from 15 or 25 to 300 or 350 carbon atoms, or from 50 or 120 to 250 carbon atoms, or from 135 to 200 carbon atoms; X1 and X2, individually, can be H or a group derived from the quaternizing agent, so long as at least one of X1 and X2 is a group derived from the quaternizing agent. In some embodiments, $R^{24}$ can be a hydrocarbyl group containing from 92 to 215 carbon atoms, or from 107 to 200 or 210 carbon atoms, or from 120 to 195 carbon atoms, or from 135 to 190 or from 140 to 180 or 185 carbon atoms, or a hydrocarbyl group containing from 20 to 55 carbon atoms, or from 25 to 50, or from 28 to 43 or 47 carbon atoms.

In some embodiments the quaternary ammonium salt can comprise, consist essentially of, or consist of a cation represented by the following formula:

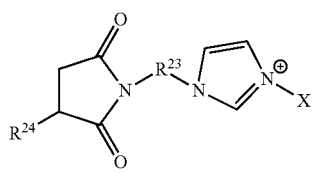

(XVIII)

wherein: $R^{23}$ is a hydrocarbylene group containing from 1 to 20 carbon atoms; $R^{24}$ is a hydrocarbyl group containing from 5 to 400 carbon atoms, or from 15 or 25 to 300 or 350 carbon atoms, or from 50 or 120 to 250 carbon atoms, or from 135 to 200 carbon atoms; and X is a group derived from the quaternizing agent. In some embodiments, $R^{24}$ can be a hydrocarbyl group containing from 92 to 215 carbon atoms, or from 107 to 200 or 210 carbon atoms, or from 120 to 195 carbon atoms, or from 135 to 190 or from 140 to 180 or 185 carbon atoms, or a hydrocarbyl group containing from 20 to 55 carbon atoms, or from 25 to 50, or from 28 to 43 or 47 carbon atoms.

In some embodiments the quaternary ammonium salt can comprise, consist essentially of, or consist of a coupled quaternary ammonium compound represented by the following formula:

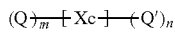
(XIX)

wherein: Q and Q' are the same or different and represent quaternizeable compounds, m and n are, individually, integers of between 1 and 4, and Xc represents a group derived from a coupling quaternizing agent, such as, for example, polyepoxides; polyhalides; epoxy-halides; aromatic polyesters; and mixtures thereof, including, but not limited to, 1,4-butanediol diglycidyl ether, 1,12-dibromododecane, and bisphenol A diglycidyl ether. Example coupled quaternary ammonium compounds can include, for example, any of the formulas below:

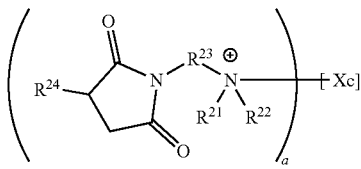
(XX)

where a is an integer of from 2 to 8. An example of formula XX where a is 2 or 3 can be represented, for example by formula XX' and XX" respectively;

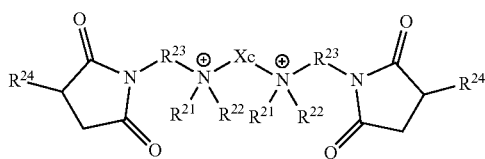
(XX')

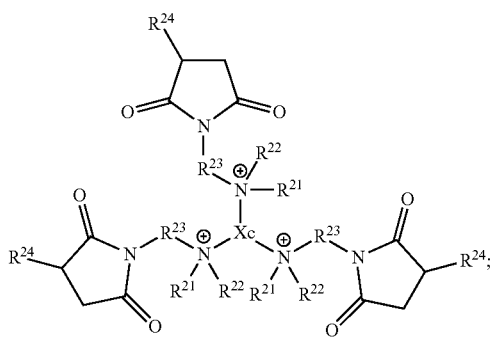
(XX")

Another example coupled quaternary ammonium compound can be, for example, as provided in formula XXI below:

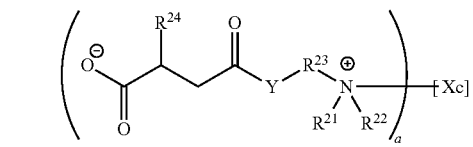
(XXI)

where a is an integer of from 2 to 8. An example of formula XXI where a is 2 or 3 can be represented, for example by formula XXI' and XXI", respectively;

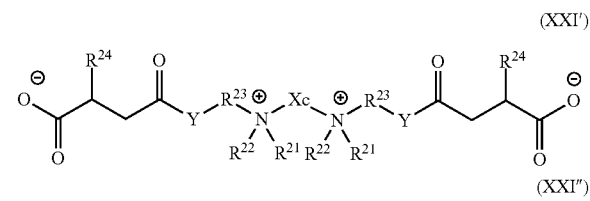
(XXI')

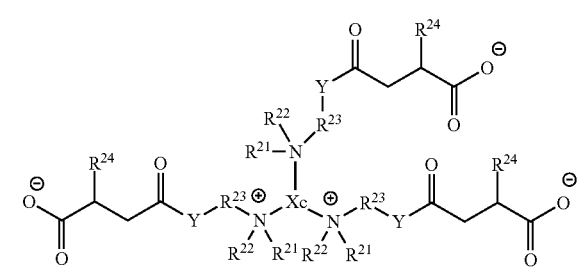
(XXI")

Further example coupled quaternary ammonium compounds can be, for example, as provided in formulas XXII and XXIII below:

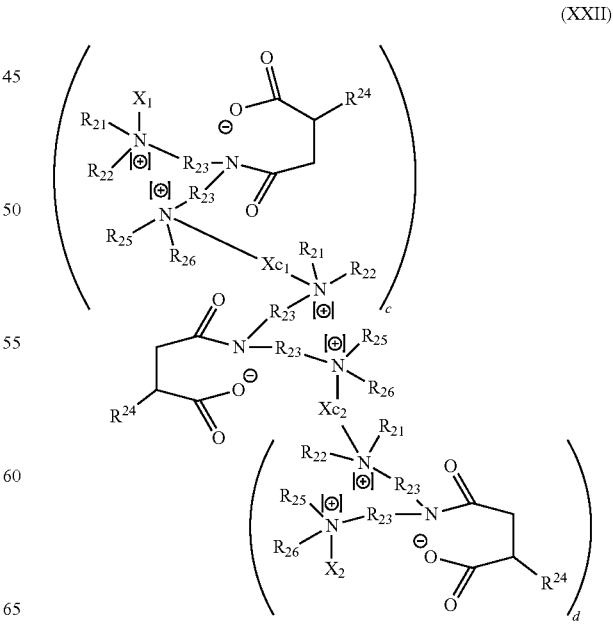
(XXII)

where c and d are, individually, 0 or 1;

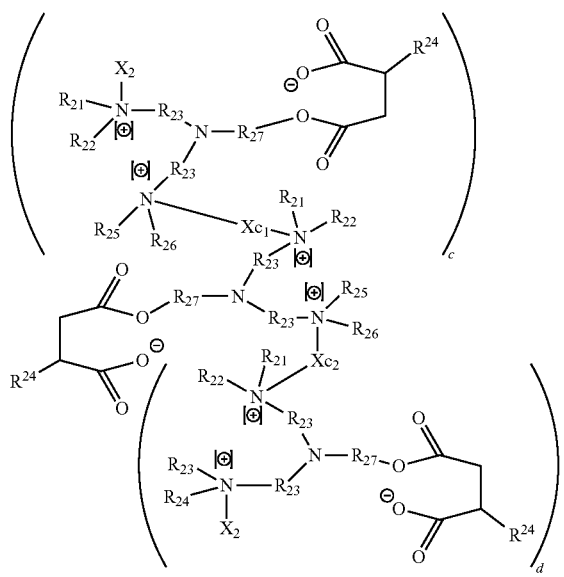

(XXIII)

where c and d are, individually, 0 or 1;

Even further example coupled quaternary ammonium compounds can be, for example, as provided in formulas XXIV below:

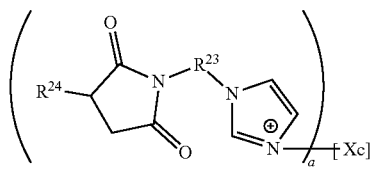

(XXIV)

where a is an integer of from 2 to 8. An example of formula XXIV where a is 2 or 3 can be represented, for example by formula XXIV' and XXIV'", respectively;

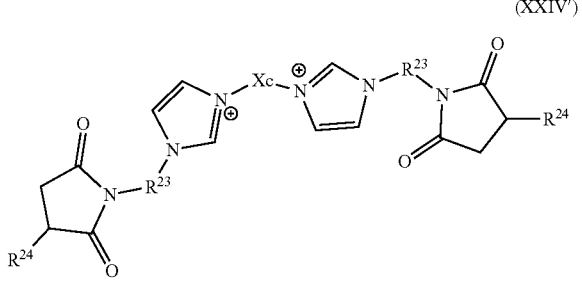

(XXIV')

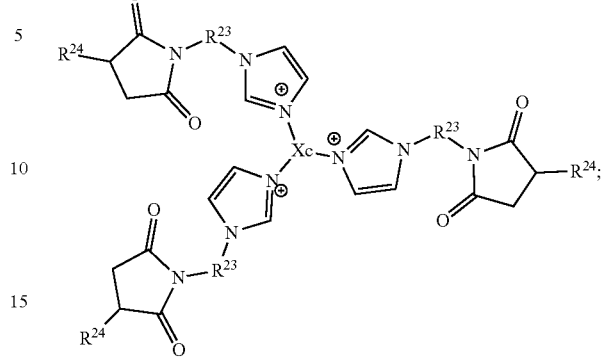

(XXIV")

and wherein: $R^{21}$, $R^{22}$, $R^{25}$, and $R^{26}$ can be, individually, a hydrocarbyl group containing from 1 to 10 carbon atoms; $R^{23}$ and $R^{27}$ can be, individually, a hydrocarbylene group containing from 1 to 20 carbon atoms; $R^{24}$ can be a hydrocarbyl group containing from 5 to 400 carbon atoms, or from 15 or 25 to 300 or 350 carbon atoms, or from 50 or 120 to 250 carbon atoms, or from 135 to 200 carbon atoms; Xc can be a group derived from the quaternizing agent; and X1 and X2, individually, can be H or a group derived from the quaternizing agent. In some embodiments, $R^{24}$ can be a hydrocarbyl group containing from 92 to 215 carbon atoms, or from 107 to 200 or 210 carbon atoms, or from 120 to 195 carbon atoms, or from 135 to 190 or from 140 to 180 or 185 carbon atoms, or a hydrocarbyl group containing from 20 to 55 carbon atoms, or from 25 to 50, or from 28 to 43 or 47 carbon atoms.

Rust Preventative

The coating composition includes a rust preventative. Rust preventatives can be any material that helps prevent corrosion or rust (with ferrous metal) on a metal surface.

In an embodiment, the rust preventative can be a wax or contain a wax. Example waxes include petroleum, synthetic, and natural waxes produced by plants or animals, which may or may not be hydrogenated, oxidized waxes, microcrystalline waxes, wool grease (lanolin) and other waxy esters, and mixtures thereof. Petroleum waxes are paraffinic compounds isolated from crude oil via some refining process, such as slack wax and paraffin wax. Synthetic waxes are waxes derived from petro-chemicals, such as ethylene or propylene. Synthetic waxes include polyethylene, polypropylene, and ethylene-propylene co-polymers. Natural waxes are waxes produced by plants and/or animals or insects. These waxes include beeswax, soy wax and carnauba wax. Insect and animal waxes include beeswax, or spermaceti. Petrolatum and oxidized petrolatum may also be used in these compositions. Petrolatums and oxidized petrolatums may be defined, respectively, as purified mixtures of semisolid hydrocarbons derived from petroleum and their oxidation products. Microcrystalline waxes may be defined as higher melting point waxes purified from petrolatums. In one embodiment the rust preventive can contain a hydrogenated or partially hydrogenated: coconut oil, palm oil, sunflower oil, safflower oil, castor oil, canola oil, soy oil, candelilla oil, cotton seed oil and the like. In an embodiment, the rust preventive can contain a hydrogenated or partially hydrogenated: coconut oil or soy oil.

The wax(es) may be present in the rust preventive composition at from 0.1 wt % to 75 wt %, e.g., 0.1 wt % to 50 wt %.

The rust preventative can be a corrosion inhibitor. Other corrosion inhibitors in addition to the exemplary compounds may also be used in the compositions provided herein. The corrosion inhibitors which may be used include thiazoles, triazoles and thiadiazoles. Examples include, but are not limited to benzotriazole, tolyltriazole, octyltriazole, decyltriazole, dodecyltriazole, 2-mercaptobenzothiazole, 2,5-dimercapto-1,3,4-thiadiazole, 2-mercapto-5-hydrocarbylthio-1,3,4-thiadiazoles, 2-mercapto-5-hydrocarbyldithio-1,3,4-thiadiazoles, 2,5-bis(hydrocarbylthio)-1,3,4-thiadiazoles, and 2,5-bis-(hydrocarbyldithio)-1,3,4-thiadiazoles. Other suitable inhibitors of corrosion include ether amines; polyethoxylated compounds such as ethoxylated amines, ethoxylated phenols, and ethoxylated alcohols; imidazolines. Other suitable corrosion inhibitors include alkenylsuccinic acids in which the alkenyl group contains 10 or more carbon atoms such as, for example, tetrapropenylsuccinic acid, tetradecenylsuccinic acid, hexadecenylsuccinic acid; long-chain alpha, omega-dicarboxylic acids in the molecular weight range of 600 to 3000; and other similar materials. Other non-limiting examples of such inhibitors may be found in U.S. Pat. Nos. 3,873,465, 3,932,303, 4,066,398, 4,402,907, 4,971,724, 5,055,230, 5,275,744, 5,531,934, 5,611,991, 5,616,544, 5,744,069, 5,750,070, 5,779,938, and 5,785,896; Corrosion Inhibitors, C. C. Nathan, ed., NACE, 1973; I. L. Rozenfeld, Corrosion Inhibitors, McGraw-Hill, 1981; Metals Handbook, $9^{th}$ Ed., Vol. 13 Corrosion, pp. 478497; Corrosion Inhibitors for Corrosion Control, B. G. Clubley, ed., The Royal Society of Chemistry, 1990; Corrosion Inhibitors, European Federation of Corrosion Publications Number 11, The Institute of Materials, 1994; Corrosion, Vol. 2—Corrosion Control, L. L. Sheir, R. A. Jarman, and G. T. Burstein, eds., Butterworth-Heinemann, 1994, pp. 17:10-17:39; Y. I. Kuznetsov, Organic inhibitors of Corrosion of Metals, Plenum, 1996; and in V. S. Sastri, Corrosion Inhibitors: Principles and Applications, Wiley, 1998.

The other corrosion inhibitor(s) may be present in the coating composition at from 0.0001 wt % to 10 wt %, e.g., 0.001 wt % to 8 wt %, or 0.01 to 5 wt %, or 0.1 to 3 wt %.

The rust preventative can contain a sulfonate, or a sulfonate salt such as an alkali metal sulfonate, alkaline earth metal sulfonate, or amine sulfonate. All the sulfonate salts have a satisfactorily high safety for the human body and the ecosystem and can be produced by reacting an alkali metal, an alkaline earth metal, or an amine with sulfonic acid. Examples of alkali metals that constitute sulfonate salts include sodium and potassium. Examples of alkaline earth metals include magnesium, calcium, and barium. Among these alkali metals and alkaline earth metals, sodium, potassium, calcium, and barium are preferred, and particularly calcium is preferred. Examples of amines to be used include a monoamine, a polyamine, or an alkanolamine. The above-mentioned sulfonic acid may be a known sulfonic acid produced by a routine method. Sulfonates and sulfonate salts are generally known and specific examples of such sulfonates and sulfonate salts can be seen, for example, in U.S. Pat. No. 9,080,123 to Motoyama, issued Jul. 14, 2015, at col. 8, line 51 to col. 13, line 44, incorporated herein by reference.

Sulfonates and sulfonate salts may be present in the coating composition at from about 10 wt % to about 60 wt %, e.g., about 15 wt % to about 55 wt %, or about 20 to about 50 wt %.

Diluent

The disclosed technology provides compositions that may include a diluent, such as, for example, an oil of lubricating viscosity or a volatile diluent. By "volatile diluent" is meant a normally liquid component that has a volatility greater than that of an oil of lubricating viscosity, such as mineral oil.

Oils of lubricating viscosity can include natural and synthetic oils, oil derived from hydrocracking, hydrogenation, and hydrofinishing, unrefined, refined, re-refined oils or mixtures thereof. A more detailed description of unrefined, refined and re-refined oils is provided in International Publication WO2008/147704, paragraphs [0054] to [0056] (a similar disclosure is provided in US Patent Application 2010/197536, see [0072] to [0073]). A more detailed description of natural and synthetic lubricating oils is described in paragraphs [0058] to [0059] respectively of WO2008/147704 (a similar disclosure is provided in US Patent Application 2010/197536, see [0075] to [0076]). Synthetic oils may also be produced by Fischer-Tropsch reactions and typically may be hydroisomerized Fischer-Tropsch hydrocarbons or waxes. In one embodiment oils may be prepared by a Fischer-Tropsch gas-to-liquid synthetic procedure as well as other gas-to-liquid (GTL) oils.

Oils of lubricating viscosity may also be defined as specified in April 2008 version of "Appendix E—API Base Oil Interchangeability Guidelines for Passenger Car Motor Oils and Diesel Engine Oils", section 1.3 Sub-heading 1.3. "Base Stock Categories". The API Guidelines are also summarized in U.S. Pat. No. 7,285,516 (see column 11, line 64 to column 12, line 10). In one embodiment the oil of lubricating viscosity may be an API Group II, Group III, Group IV oil, or mixtures thereof.

In one embodiment, the oil of lubricating viscosity has little natural ability to swell seals, for example, a polyalphaolefin (PAO) or GTL oil. Both PAO & GTL base stocks are highly paraffinic in nature (low levels of aromaticity). PAOs are 100% isoparaffinic with essentially zero percent aromatics. Likewise, GTL base oils have a very highly paraffinic content and again, essentially zero aromatic content. As a result, both PAO and GTL base oils are regarded as having low solvency and poor lubricant additive solubility performance. They also exhibit little natural ability to swell seals.

Poly-alpha olefin base oils (PAOs), and their manufacture, are generally well known. The PAO base oils may be derived from linear C2 to C32, preferably C4 to C16, alpha olefins. Particularly preferred feedstocks for PAOs are 1-octene, 1-decene, 1-dodecene and 1-tetradecene. An exemplary PAO has a kinematic viscosity at 100° C. of about 3.96 mm$^2$ s$^{-1}$ and a VI of 101. The oil of lubricating viscosity may be an API Group IV oil, or mixtures thereof, i.e., a polyalphaolefin. The polyalphaolefin may be prepared by metallocene catalyzed processes or from a non-metallocene process.

GTL base oils include base oils obtained by one or more possible types of GTL processes, typically a Fischer-Tropsch process. The GTL process takes natural gas, predominantly methane, and chemically converts it to synthesis gas, or syngas. Alternatively, solid coal can also be converted into synthesis gas. Synthesis gas mainly contains carbon monoxide (CO) and hydrogen ($H_2$), which are mostly subsequently chemically converted to paraffins by a catalytic Fischer-Tropsch process. These paraffins will have a range of molecular weights and by the use of catalysts can be hydroisomerized to produce a range of base oils. GTL base stocks have a highly paraffinic character, typically greater than 90% saturates. Of these paraffinics, the non-cyclic paraffinic species predominate over the cyclic paraffinic species. For example, GTL base stocks typically comprise greater than 60 wt %, or greater than 80 wt %, or greater than 90 wt % non-cyclic paraffinic species. GTL base oils typically have a kinematic viscosity at 100° C. of between 2 mm$^2$ s$^{-1}$ and 50 mm$^2$ s$^{-1}$, or 3 mm$^2$ s$^{-1}$ to 50 mm$^2$ s$^{-1}$, or 3.5 mm$^2$ s$^{-1}$ to 30 mm$^2$ s$^{-1}$. The GTL exemplified in this instance has a kinematic viscosity at 100° C. of about 4.1 mm$^2$ s$^{-1}$. Likewise, the GTL base stocks are typically characterized as having a viscosity index (VI, refer to ASTM D2270) of 80 or greater, or 100 or greater, or 120 or greater. The GTL exemplified in this instance has a VI of 129. Typically GTL base fluids have effectively zero sulfur and nitrogen contents, generally less than 5 mg/kg of each of these elements. GTL base stocks are Group III oils, as classified by the American Petroleum Institute (API).

The volatile diluent may comprise water or one or more organic solvents. The diluent may thus comprise a volatile organic solvent such as naphtha (also known as petroleum ether), mineral spirits, kerosene, or ethyl lactate. Among these materials may be hydrocarbon solvents. Such materials may have a boiling point of 30 to 60° C. or higher temperatures, up to a range of 175 to 280° C. Some such volatile diluents may have a boiling range of 130-210° C.; others 196-205° C. Overall, a diluent may be considered volatile if its boiling point is less than 280° C.

The volatile diluent may be present in a concentrate of the foregoing components, if desired, although most commonly the diluent, or the majority of the diluent will be added in preparing the fully formulated, diluted coating composition. The amount of diluent will typically be an amount to provide for appropriate viscosity and rheological performance so that the coating composition may be applied to a substrate such as a metallic article or surface. Thus, if the concentrate is diluted to 20 percent in the final coating composition, the total amount of diluent will typically include 80 percent additional solvent or diluent to make the dilution. The overall total amount of the diluent (if present) will depend, of course, on the amount of dilution used to prepare the final coating composition and so may be 40 to 98 percent by weight, or 60 to 98, or 40 to 95, or 60 to 88, or 80 to 86, or 82 to 84 percent by weight. The amount of the other components will typically be 100% by weight less the amount of the optional volatile diluent, such as 2 to 60 weight percent and other amounts that may be readily determined by the skilled person.

That is, one of the ways in which the present technology may be employed is by preparing an initial mixture of the components described herein, without the presence of the optional diluent, or with its presence only in small amounts such as up to 10 percent or 5 percent or 2 percent or 1 percent or 0.1 percent by weight of the composition. For this reason, the amounts of the other components may be expressed as a percentage of the composition exclusive of the amount of the optional diluent. It is in this form (diluent-free) that the materials of the disclosed technology may often be commercially prepared and distributed. However, the diluent-free material may have a viscosity that is unsuitable for easy handling, so addition of a diluent may be desirable before the composition is applied as a coating to a substrate. If, at the time of application of the coating, a diluent is present, then the actual amounts of the other components can be calculated to take into account the presence of the diluent. Thus, if an ingredient is present at 30 weight percent in the initial formulation (without diluent or factoring out the presence of any diluent), and if the composition, at the time it is applied as a coating, contains 80 percent by weight of diluent, then, at the time of application as a coating, the actual concentration of the ingredient in the coating composition as applied will be 6 weight percent. Since the diluent will typically thereafter be removed, e.g., by evaporation, then the concentration of the various components after such removal may be the same as reported before the addition of the diluent. Of course, with the passage of time some further "drying" or curing of the coating composition may occur, so the amounts or even identities of the components may alter in a manner that will be apparent to the skilled person.

A lubricant composition may be prepared by adding the quaternary ammonium salt to a diluent, optionally in the presence of other performance additives (as described herein below).

Other Performance Additives: Metal Working Fluids

In one embodiment, the present technology provides a coating composition comprising a rust preventative and a quaternary ammonium salt, and the use of the coating composition as a multi-purpose functional fluid for coating, cooling, and lubricating metal surfaces, particularly ferrous metal surfaces. In another embodiment, the quaternary ammonium salt is employed to improve water separation within a coating composition containing a rust preventative. In some embodiments, the quaternary ammonium salt may be included to improve water separation within a hydraulic fluid.

A coating composition may be prepared by adding the quaternary ammonium salt disclosed herein and to a diluent, optionally in the presence of other performance additives (as described herein below).

Typical metal working fluid applications may include metal removal, metal forming, metal treating and metal protection. In some embodiments the coating composition may contain a Group I, Group II or Group III base stock as defined by the American Petroleum Institute. In some embodiments, the coating composition may be mixed with Group IV or Group V base stock. In one embodiment the coating composition contains 0.001 wt % to 5 wt % of a quaternary ammonium salt or 0.01 wt % to 1 wt % or 0.01 or 0.05 to 0.5 wt %.

In some embodiments the coating composition includes an oil. The oil may include most liquid hydrocarbons, for example, paraffinic, olefinic, naphthenic, aromatic, saturated or unsaturated hydrocarbons. In general, the oil is a water-immiscible, emulsifiable hydrocarbon, and in some embodiments the oil is liquid at room temperature. Oils from a variety of sources, including natural and synthetic oils and mixtures thereof may be used.

Natural oils include animal oils and vegetable oils (e.g., soybean oil, lard oil) as well as solvent-refined or acid-refined mineral oils of the paraffinic, naphthenic, or mixed paraffin-naphthenic types. Oils derived from coal or shale are also useful. Synthetic oils include hydrocarbon oils and halo-substituted hydrocarbon oils such as polymerized and interpolymerized olefins e.g., polybutylenes, polypropylenes, propylene-isobutylene copolymers, chlorinated polybutylenes; alkyl benzenes e.g., dodecylbenzenes, tetradecylbenzenes, dinonylbenzenes, or di-(2-ethylhexyl) benzenes.

Another suitable class of synthetic oils that may be used comprises the esters of dicarboxylic acids (e.g., phthalic acid, succinic acid, alkyl succinic acid, maleic acid, azelaic acid, suberic acid, sebacic acid, fumaric acid, adipic acid, linoleic acid dimer, malonic acid, alkyl malonic acids, alkenyl malonic acids, etc.) with a variety of alcohols (e.g., butyl alcohol, hexyl alcohol, dodecyl alcohol, 2-ethylhexyl alcohol, ethylene glycol, diethylene glycol monoether, propylene glycol, pentaerythritol, etc.). Specific examples of these esters include dibutyl adipate, di(2-ethylhexyl)-sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, or a complex ester formed by reacting one mole of sebacic acid with two moles of tetraethylene glycol and two moles of 2-ethyl-hexanoic acid.

Esters useful as synthetic oils also include those made from $C_5$ to $C_{12}$ monocarboxylic acids and polyols and polyol ethers such as neopentyl glycol, trimethylol propane, pentaerythritol, dipentaerythritol, tripentaerythritol, etc.

Unrefined, refined and rerefined oils (and mixtures of each with each other) of the type disclosed hereinabove may be used. Unrefined oils are those obtained directly from a natural or synthetic source without further purification treatment. For example, a shale oil obtained directly from a retorting operation, a petroleum oil obtained directly from distillation or ester oil obtained directly from an esterification process and used without further treatment would be an unrefined oil. Refined oils are similar to the unrefined oils except that they have been further treated in one or more purification steps to improve one or more properties. Many such purification techniques are known to those of skill in the art such as solvent extraction, distillation, acid or base extraction, filtration, percolation, etc. Re-refined oils are obtained by processes similar to those used to obtain refined oils applied to refined oils which have been already used in service. Such re-refined oils are also known as reclaimed or reprocessed oils and often are additionally processed by techniques directed toward removal of spent additives and oil breakdown products.

In some embodiments, the oil is a Group II or Group III base stock as defined by the American Petroleum Institute.

Optional additional materials may be incorporated in the coating compositions. Typical finished compositions may include lubricity agents such as fatty acids and waxes, anti-wear agents, dispersants, corrosion inhibitors, normal and overbased detergents, demulsifiers, biocidal agents, metal deactivators, or mixtures thereof.

The coating compositions of the disclosed technology can also include a carboxylic diacid or polyacid having at least 10 carbon atoms. By "polyacid" is meant a material having three or more carboxylic acid groups. However, if the diacid or polyacid is a diacid having two carboxylic acid groups on adjacent carbon atoms, then the diacid should have at least 14 total carbon atoms. In one embodiment, the diacid or polyacid is a diacid having at least 16 carbon atoms, the two carboxylic acid groups being separated by at least 6 carbon atoms. In such an embodiment, there may also be more than two carboxylic acid groups present, but if so, then at least two of them may be separated by at least 6 carbon atoms which are not themselves substituted by a carboxylic group. The separating carbon atoms in such an embodiment are typically non-aromatic and, in one embodiment, they comprise a carbon chain, that is, without interruption by inserted oxygen or nitrogen atoms. In certain embodiments the carboxylic groups may be separated by 8 to 24 carbon atoms, or 10 to 20, or 12 to 20, or 14 to 18 carbon atoms.

One type of diacid is known as dimer acids or dimerized acids. Dimer acids are products typically prepared by dimerization of long chain, e.g., C18, unsaturated fatty acids. They are often prepared by self-condensation of oleic acid or tall oil fatty acids. Dimer acids are mixtures of relatively high molecular weight materials, m.w. around 560, yet are liquid at room temperature. They are commercially available materials that may be prepared by either a Diels-Alder reaction or by a free radical route, or by catalysis on a substrate such as clay.

Dimer acids and their preparation are extensively discussed in the *Kirk-Othmer Encyclopedia of Chemical Technology*, Third Edition, volume 7, pages 768-782, John Wiley & Sons, New York (1979).

In another embodiment, a diacid may include a hydrocarbyl-substituted succinic acid having at least 14 carbon atoms including the four carbon atoms of the succinic acid moiety, e.g., succinic acid substituted with a 10-carbon alkyl. In other embodiments there will be at least 12, 14, 16, or 18 carbon atoms in such an alkyl substituent (for a total number of 16, 18, 20, or 22 carbon atoms). The number of atoms in the akyl substituent may be up to 36 or 30 or 24 or 22 carbon atoms.

In another embodiment, the diacid may be an α, ω-alkylene diacid, of at least 10 or 12 carbon atoms, and up to, for instance, 36 or 24 or 18 carbon atoms. Examples include 1,10-decanedioic acid, 1,12-dodecanedioic acid, and 1,18-octadecanedioic acid.

The amount of the above-described diacid or polyacid in the coating composition of the disclosed technology, when in a concentrate, may be 2 to 20 percent by weight, or 3 to 10 percent, or 5 to 6 percent. The corresponding amount in a fully formulated, diluted coating composition may be 0.1 to 14 percent, or 0.2 to 10 percent, or 0.4 to 8 percent, or 0.4 to 5 percent or 1 to 5 percent.

Another optional material is a fatty acid, which is to be distinguished from the diacid or dimer acids described above. Fatty acids useful herein include monocarboxylic acids of 8 to 35 carbon atoms, and in one embodiment 16 to 24 carbon atoms. Examples of such monocarboxylic acids include unsaturated fatty acids, such as myristoleic acid, palmitoleic acid, sapienic acid, oleic acid, elaidic acid, vaccenic acid, linoleic acid, linoelaidic acid; α-linolenic acid; arachidonic acid; eicosapentaenoic acid; erucic acid, docosahexaenoic acid; and saturated fatty acids, such as caprylic acid; capric acid; lauric acid, myristic acid; palmitic acid; stearic acid, arachidic acid, behenic acid; lignoceric acid, cerotic acid, isostearic acid, gadoleic acid, tall oil fatty acids, or combinations thereof. These acids may be saturated, unsaturated, or have other functional groups, such as hydroxy groups, as in 12-hydroxy stearic acid, from the hydrocarbyl backbone. Other example carboxylic acids are described in U.S. Pat. No. 7,435,707.

The fatty acid(s) may be present in the metalworking composition at from 0.1 wt % to 50 wt %, or 0.1 wt % to 25 wt %, or 0.1 wt % to 10 wt %.

Example overbased detergents include overbased metal sulfonates, overbased metal phenates, overbased metal salicylates, overbased metal saliginates, overbased metal carboxylates, or overbased amine sulfonate detergents. The overbased detergents contain metals such as Mg, Ba, Sr, Zn, Na, Ca, K, and mixtures thereof. Overbased detergents are metal salts or complexes characterized by a metal content in excess of that which would be present according to the stoichiometry of the metal and the particular acidic organic compound reacted with the metal, e.g., a sulfonic acid.

The term "metal ratio" is used herein to designate the ratio of the total chemical equivalents of the metal in the overbased material (e.g., a metal sulfonate or carboxylate) to the chemical equivalents of the metal in the product which would be expected to result in the reaction between the organic material to be overbased (e.g., sulfonic or carboxylic acid) and the metal-containing reactant used to form the detergent (e.g., calcium hydroxide, barium oxide, etc.) according to the chemical reactivity and stoichiometry of the two reactants. Thus, while in a normal calcium sulfonate, the metal ratio is one, in the overbased sulfonate, the metal ratio is 4.5.

Examples of such detergents are described, for example, in U.S. Pat. Nos. 2,616,904; 2,695,910; 2,767,164; 2,767,209; 2,798,852; 2,959,551; 3,147,232; 3,274,135; 4,729,791; 5,484,542 and 8,022,021.

The overbased detergents may be used alone or in combination. The overbased detergents may be present in the range from 0.1 wt % to 50%; such as at least 1 wt % or up to 10 wt % of the composition.

Demulsifiers useful herein include polyethylene glycol, polyethylene oxides, polypropylene alcohol oxides (ethylene oxide-propylene oxide) polymers, polyoxyalkylene alcohol, alkyl amines, amino alcohol, diamines or polyamines reacted sequentially with ethylene oxide or substituted ethylene oxide mixtures, trialkyl phosphates, and combinations thereof.

The demulsifier(s) may be present in the corrosion-inhibiting composition at from 0.0001 wt % to 10 wt %, e.g., 0.0001 wt % to 2.5 wt %

Dispersants which may be included in the composition include those with an oil soluble polymeric hydrocarbon backbone and having functional groups that are capable of associating with particles to be dispersed. The polymeric hydrocarbon backbone may have a weight average molecular weight ranging from 750 to 1500 Daltons. Exemplary functional groups include amines, alcohols, amides, and ester polar moieties which are attached to the polymer backbone, often via a bridging group. Example dispersants include Mannich dispersants, described in U.S. Pat. Nos. 3,697,574 and 3,736,357; ashless succinimide dispersants described in U.S. Pat. Nos. 4,234,435 and 4,636,322; amine dispersants described in U.S. Pat. Nos. 3,219,666, 3,565,804, and 5,633,326; Koch dispersants, described in U.S. Pat. Nos. 5,936,041, 5,643,859, and 5,627,259, and polyalkylene succinimide dispersants, described in U.S. Pat. Nos. 5,851,965, 5,853,434, and 5,792,729. The dispersant(s) may be present in the metal-working composition at from 0.0001 wt % to 10 wt %, e.g., 0.0005 wt % to 2.5 wt %.

In one embodiment the metal working composition disclosed herein may contain at least one additional friction modifier other than the compound of the present invention. The additional friction modifier may be present at 0 wt % to 6 wt %, or 0.01 wt % to 4 wt %, or 0.05 wt % to 2 wt %, or 0.1 wt % to 2 wt % of the metal-working composition.

As used herein the term "fatty alkyl" or "fatty" in relation to friction modifiers means a carbon chain having 10 to 22 carbon atoms, typically a straight carbon chain. Alternatively, the fatty alkyl may be a mono branched alkyl group, with branching typically at the β-position. Examples of mono branched alkyl groups include 2-ethylhexyl, 2-propylheptyl or 2-octyldodecyl.

Examples of suitable friction modifiers include long chain fatty acid derivatives of amines, fatty esters, or fatty epoxides; fatty imidazolines such as condensation products of carboxylic acids and polyalkylene-polyamines; amine salts of alkylphosphoric acids; fatty phosphonates; fatty phosphites; borated phospholipids, borated fatty epoxides; glycerol esters; borated glycerol esters; fatty amines; alkoxylated fatty amines; borated alkoxylated fatty amines; hydroxyl and polyhydroxy fatty amines including tertiary hydroxy fatty amines; hydroxy alkyl amides; metal salts of fatty acids; metal salts of alkyl salicylates; fatty oxazolines; fatty ethoxylated alcohols; condensation products of carboxylic acids and polyalkylene polyamines; or reaction products from fatty carboxylic acids with guanidine, aminoguanidine, urea, or thiourea and salts thereof.

Friction modifiers may also encompass materials such as sulfurized fatty compounds and olefins, molybdenum dialkyldithiophosphates, molybdenum dithiocarbamates, or other oil soluble molybdenum complexes such as Molyvan® 855 (commercially available from R. T. Vanderbilt, Inc) or Sakuralube® S-700 or Sakuralube® S-710 (commercially available from Adeka, Inc). The oil soluble molybdenum complexes assist in lowering the friction, but may compromise seal compatibility.

In one embodiment the friction modifier may be an oil soluble molybdenum complex. The oil soluble molybdenum complex may include molybdenum dithiocarbamate, molybdenum dithiophosphate, molybdenum blue oxide complex or other oil soluble molybdenum complex or mixtures thereof. The oil soluble molybdenum complex may be a mix of molybdenum oxide and hydroxide, so called "blue" oxide. The molybdenum blue oxides have the molybdenum in a mean oxidation state of between 5 and 6 and are mixtures of $MoO_2(OH)$ to $MoO_{2.5}(OH)_{0.5}$. An example of the oil soluble is molybdenum blue oxide complex known by the tradename of Luvodor® MB or Luvador® MBO (commercially available from Lehmann and Voss GmbH), The oil soluble molybdenum complexes may be present at 0 wt % to 5 wt %, or 0.1 wt % to 5 wt % or 1 to 3 wt % of the metal-working composition.

In one embodiment the friction modifier may be a long chain fatty acid ester. In another embodiment the long chain fatty acid ester may be a mono-ester and in another embodiment the long chain fatty acid ester may be a triglyceride such as sunflower oil or soybean oil or the monoester of a polyol and an aliphatic carboxylic acid.

The extreme pressure agent may be a compound containing sulfur and/or phosphorus and/or chlorine. Examples of an extreme pressure agents include a polysulfide, a sulfurized olefin, a thiadiazole, chlorinated paraffins, overbased sulfonates or mixtures thereof.

Examples of a thiadiazole include 2,5-dimercapto-1,3,4-thiadiazole, or oligomers thereof, a hydrocarbyl-substituted 2,5-dimercapto-1,3,4-thiadiazole, a hydrocarbylthio-substituted 2,5-dimercapto-1,3,4-thiadiazole, or oligomers thereof. The oligomers of hydrocarbyl-substituted 2,5-dimercapto-1,3,4-thiadiazole typically form by forming a sulfur-sulfur bond between 2,5-dimercapto-1,3,4-thiadiazole units to form oligomers of two or more of said thiadiazole units. Examples of a suitable thiadiazole compound include at least one of a dimercaptothiadiazole, 2,5-dimercapto-[1,3,4]-thiadiazole, 3,5-dimercapto-[1,2,4]-thiadiazole, 3,4-dimercapto-[1,2,5]-thiadiazole, or 4-5-dimercapto-[1,2,3]-thiadiazole. Typically readily available materials such as 2,5-dimercapto-1,3,4-thiadiazole or a hydrocarbyl-substituted 2,5-dimercapto-1,3,4-thiadiazole or a hydrocarbylthio-substituted 2,5-dimercapto-1,3,4-thiadiazole are commonly utilised. In different embodiments the number of carbon atoms on the hydrocarbyl-substituent group includes 1 to 30, 2 to 25, 4 to 20, 6 to 16, or 8 to 10. The 2,5-dimercapto-1,3,4-thiadiazole may be 2,5-dioctyl dithio-1,3,4-thiadiazole, or 2,5-dinonyl dithio-1,3,4-thiadiazole.

In one embodiment at least 50 wt % of the polysulfide molecules are a mixture of tri- or tetra-sulfides. In other embodiments at least 55 wt %, or at least 60 wt % of the polysulfide molecules are a mixture of tri- or tetra-sulfides.

The polysulfide includes a sulfurized organic polysulfide from oils, fatty acids or ester, olefins or polyolefins.

Oils which may be sulfurized include natural or synthetic oils such as mineral oils, lard oil, carboxylate esters derived from aliphatic alcohols and fatty acids or aliphatic carboxylic acids (e.g., myristyl oleate and oleyl oleate), and synthetic unsaturated esters or glycerides.

Fatty acids include those that contain 8 to 30, or 12 to 24 carbon atoms. Examples of fatty acids include oleic, linoleic, linolenic, and tall oil. SulfurizedSulfurized fatty acid esters prepared from mixed unsaturated fatty acid esters such as are obtained from animal fats and vegetable oils, including tall oil, linseed oil, soybean oil, rapeseed oil, and fish oil.

The polysulfide includes olefins derived from a wide range of alkenes. The alkenes typically have one or more double bonds. The olefins in one embodiment contain 3 to 30 carbon atoms. In other embodiments, olefins contain 3 to 16, or 3 to 9 carbon atoms. In one embodiment the sulfurized olefin includes an olefin derived from propylene, isobutylene, pentene or mixtures thereof.

In one embodiment the polysulfide comprises a polyolefin derived from polymerizing by known techniques an olefin as described above.

In one embodiment the polysulfide includes dibutyl tetrasulfide, sulfurized methyl ester of oleic acid, sulfurized alkylphenol, sulfurized dipentene, sulfurized di cyclopentadiene, sulfurized terpene, and sulfurized Diels-Alder adducts.

Chlorinated paraffins may include both long chain chlorinate paraffins ($C_{20+}$ and medium chain chlorinated paraffins ($C_{14}$-$C_{17}$). Examples include Choroflo, Paroil and Chlorowax products from Dover Chemical.

Overbased sulfonates have been discussed above. Examples of overbased sulfonates include Lubrizol® 5283C, Lubrizol® 5318A, Lubrizol® 5347LC and Lubrizol® 5358.

The extreme pressure agent may be present at 0 wt % to 25 wt %, 1.0 wt % to 15.0 wt %, 2.0 wt % to 10.0 wt % of the metalworking composition.

The metal working fluid may have a composition defined in the following table:

| Metalworking Compositions | | | |
|---|---|---|---|
| | Embodiments (wt %) | | |
| Additive | Heavy Duty Oil | Flute Grinding | Hot Mill Oil for Steel Rolling |
| Salt of the invention | 0.001-5 | 0.001-5 | 0.001-5 |
| Corrosion Preventative Compound | 1-15 | 1-15 | 1-15 |
| Friction Modifier Agent | — | 1-5 | — |
| Extreme Pressure Agent | 0.1-15 | 0.1-5 | 1-15 |
| Phenolic or Aminic Antioxidant | 0-5 | 0-5 | 0-5 |
| Dispersant | 0-3 | 0-3 | 0-3 |
| Diluent Oil | Balance to 100% | Balance to 100% (blend of 2 oils) | Balance to 100% (blend of Grp II/III and Grp V oil) |

Specific examples of a metal working composition include those summarized in the following table:

| Metalworking Compositions | | | |
|---|---|---|---|
| | Embodiments (wt %) | | |
| Additive | Heavy Duty Oil | Flute Grinding | Hot Mill Oil for Steel Rolling |
| Salt of the invention | 0.1 | 0.1 | 0.1 |
| Corrosion Preventative Compound | 5 | 5 | 5 |
| Friction Modifier Agent | — | 2 | — |
| Extreme Pressure Agent | 7 | 2 | 7 |
| Phenolic or Aminic Antioxidant | 2 | 2 | 2 |
| Dispersant | 1 | 1 | 1 |
| Diluent Oil | Balance to 100% | Balance to 100% (blend of 2 oils) | Balance to 100% (blend of Grp II/III and Grp V oil) |

In order to demonstrate water separation performance in a composition, the composition may be evaluated by preparing a concentrate treated with 0.1, 0.5 and 1% of the quaternary ammonium salt. The concentrate with the additive is then diluted to 20% in solvent and 75 mL of the dilution is mixed with 25 mL of distilled water by inverting the dilution six times. The time in which it takes the rust preventive to separate the 25 mL of water is observed. ASTM B117, ASTM D1748, MIL-PRF-16173E, and MIL-C-22235A may be run to ensure corrosion protection.

In addition, to demonstrate the antiwear performance of a metalworking fluid the fluid may be evaluated versus control standards as to wear by four-ball (ASTM 4172) and friction by Microtap. Also, ASTM D665 may be run to insure corrosion protection and ATSM 2272 may be used to determine oxidative stability.

Other Performance Additives: Hydraulics Oil, Turbine Oil or Circulating Oil

In one embodiment, the quaternary ammonium salt may be employed in a lubricant composition for use in a hydraulic system, turbine system or a circulating oil system. A hydraulic system is generally a device or apparatus in which a fluid, typically an oil-based fluid, transmits energy to different parts of the system by hydraulic force. A turbine lubricant is typically used to lubricate the gears or other moving parts of a turbine (or turbine system), such as a steam turbine or a gas turbine. A circulating oil is typically used to distribute heat to or through a device or apparatus through which it is circulated.

In one embodiment the lubricant composition contains the quaternary ammonium salt in an amount from 0.005 or 0.05 to 2 wt %, or 0.01 or 0.05 to 1.5 wt %, 0.05 to 1 wt %, 0.15 to 1 wt %, 0.15 to 0.5 wt % of the overall composition.

The lubricant compositions may also contain one or more additional additives. In some embodiments the additional additives may include an antioxidant, an anti-wear agent, a corrosion inhibitor, a rust inhibitor, a foam inhibitor, a dispersant, a demulsifier, a metal deactivator, a friction modifier, a detergent, an emulsifier, an extreme pressure agent, a pour point depressant, a viscosity modifier, or any combination thereof.

The lubricant may thus comprise an antioxidant, or mixtures thereof. The anti-oxidant may be present at 0 wt % to 4.0 wt %, or 0.02 wt % to 3.0 wt %, or 0.03 wt % to 1.5 wt % of the lubricant.

Anti-oxidants include diarylamine, alkylated diarylamines, hindered phenols, molybdenum compounds (such as molybdenum dithiocarbamates), hydroxyl thioethers, trimethyl polyquinoline (e.g., 1,2-dihydro-2,2,4-trimethylquinoline), or mixtures thereof.

The diarylamine or alkylated diarylamine may be a phenyl-α-naphthylamine (PANA), an alkylated diphenylamine, or an alkylated phenylnapthylamine, or mixtures thereof. The alkylated diphenylamine may include di-nonylated diphenylamine, nonyl di-phenylamine, octyl diphenylamine, di-octylated diphenylamine, di-decylated diphenylamine, decyl diphenylamine, benzyl diphenylamine and mixtures thereof. In one embodiment the diphenylamine may include nonyl diphenylamine, dinonyl diphenylamine, octyl diphenylamine, dioctyl diphenylamine, or mixtures thereof. In one embodiment the alkylated diphenylamine may include nonyl diphenylamine, or dinonyl diphenylamine. The alkylated diarylamine may include octyl, di-octyl, nonyl, di-nonyl, decyl or di-decyl phenylnapthylamines. In one embodiment, the diphenylamine is alkylated with a benzene and t-butyl substituent.

The hindered phenol antioxidant often contains a secondary butyl and/or a tertiary butyl group as a sterically hindering group. The phenol group may be further substituted with a hydrocarbyl group (typically linear or branched alkyl) and/or a bridging group linking to a second aromatic group. Examples of suitable hindered phenol antioxidants include 2,6-di-tert-butylphenol, 4-methyl-2,6-di-tert-butylphenol, 4-ethyl-2,6-di-tert-butylphenol, 4-propyl-2,6-di-tert-butylphenol or 4-butyl-2,6-di-tert-butylphenol, or 4-dodecyl-2,6-di-tert-butylphenol. In one embodiment the hindered phenol antioxidant may be an ester and may include, e.g., Irganox™ L-135 from BASF GmbH. A more detailed description of suitable ester-containing hindered phenol anti-oxidant chemistry is found in U.S. Pat. No. 6,559,105.

Examples of molybdenum dithiocarbamates, which may be used as an antioxidants, include commercial materials sold under the trade names such as Molyvan 822®, Molyvan® A, Molyvan® 855 and from R. T. Vanderbilt Co., Ltd., and Adeka SakuraLube™ S100, S165, S600 and S525, or mixtures thereof. An example of a dithiocarbamate which may be used as an anti-oxidant or anti-wear agent is Vanlube® 7723 from R. T. Vanderbilt Co., Ltd.

The antioxidant may include a substituted hydrocarbyl mono-sulfide represented by the formula:

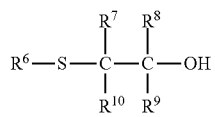

wherein $R^6$ may be a saturated or unsaturated branched or linear alkyl group with 8 to 20 carbon atoms; $R^7$, $R^8$, $R^9$ and $R^{10}$ are independently hydrogen or alkyl containing 1 to 3 carbon atoms. In some embodiments the substituted hydrocarbyl monosulfides include n-dodecyl-2-hydroxyethyl sulfide, 1-(tert-dodecylthio)-2-propanol, or combinations thereof. In some embodiments the substituted hydrocarbyl monosulfide is 1-(tert-dodecylthio)-2-propanol.

The lubricant compositions may also include a dispersant or mixtures thereof. Suitable dispersants include: (i) polyetheramines; (ii) borated succinimide dispersants; (iii) non-borated succinimide dispersants; (iv) Mannich reaction products of a dialkylamine, an aldehyde and a hydrocarbyl substituted phenol; or any combination thereof. In some embodiments the dispersant may be present at 0 wt % or 0.01 wt % to 2.0 wt %, 0.05 wt % to 1.5 wt %, or 0.005 wt % to 1 wt %, or 0.05 wt % to 0.5 wt % of the overall composition.

Dispersants which may be included in the composition include those with an oil soluble polymeric hydrocarbon backbone and having functional groups that are capable of associating with particles to be dispersed. The polymeric hydrocarbon backbone may have a weight average molecular weight ranging from 750 to 1500 Daltons. Exemplary functional groups include amines, alcohols, amides, and ester polar moieties which are attached to the polymer backbone, often via a bridging group. Example dispersants include Mannich dispersants, described in U.S. Pat. Nos. 3,697,574 and 3,736,357; ashless succinimide dispersants described in U.S. Pat. Nos. 4,234,435 and 4,636,322; amine dispersants described in U.S. Pat. Nos. 3,219,666, 3,565,804, and 5,633,326; Koch dispersants, described in U.S. Pat. Nos. 5,936,041, 5,643,859, and 5,627,259, and polyalkylene succinimide dispersants, described in U.S. Pat. Nos. 5,851,965, 5,853,434, and 5,792,729.

Anti-foam agents, also known as foam inhibitors, are known in the art and include organic silicones and non-silicon foam inhibitors. Examples of organic silicones include dimethyl silicone and polysiloxanes. Examples of non-silicon foam inhibitors include copolymers of ethyl acrylate and 2-ethylhexylacrylate, copolymers of ethyl acrylate, 2-ethylhexylacrylate and vinyl acetate, polyethers, polyacrylates and mixtures thereof. In some embodiments the anti-foam is a polyacrylate. Antifoams may be present in the composition from 0.001 wt % to 0.012 wt % or 0.004 wt % or even 0.001 wt % to 0.003 wt %.

Demulsifiers are known in the art and include derivatives of propylene oxide, ethylene oxide, polyoxyalkylene alcohols, alkyl amines, amino alcohols, diamines or polyamines reacted sequentially with ethylene oxide or substituted ethylene oxides or mixtures thereof. Examples of demulsifiers include polyethylene glycols, polyethylene oxides, polypropylene oxides, (ethylene oxide-propylene oxide) polymers and mixtures thereof. In some embodiments the demulsifiers is a polyether. Demulsifiers may be present in the composition from 0.002 wt % to 0.012 wt %.

Pour point depressants are known in the art and include esters of maleic anhydride-styrene copolymers, polymethacrylates; polyacrylates; polyacrylamides; condensation products of haloparaffin waxes and aromatic compounds; vinyl carboxylate polymers; and terpolymers of dialkyl fumarates, vinyl esters of fatty acids, ethylene-vinyl acetate copolymers, alkyl phenol formaldehyde condensation resins, alkyl vinyl ethers and mixtures thereof.

The lubricant composition may also include a rust inhibitor. Suitable rust inhibitors include hydrocarbyl amine salts of alkylphosphoric acid, hydrocarbyl amine salts of dialkyldithiophosphoric acid, hydrocarbyl amine salts of hydrocarbyl aryl sulfonic acid, fatty carboxylic acids or esters thereof, an ester of a nitrogen-containing carboxylic acid, an ammonium sulfonate, an imidazoline, alkylated succinic acid derivatives reacted with alcohols or ethers, or any combination thereof; or mixtures thereof.

Suitable hydrocarbyl amine salts of alkylphosphoric acid may be represented by the following formula:

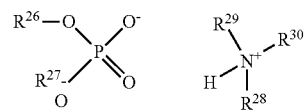

wherein $R^{26}$ and $R^{27}$ are independently hydrogen, alkyl chains or hydrocarbyl, typically at least one of $R^{26}$ and $R^{27}$ are hydrocarbyl. $R^{26}$ and $R^{27}$ contain 4 to 30, or 8 to 25, or 10 to 20, or 13 to 19 carbon atoms. $R^{28}$, $R^{29}$ and $R^{30}$ are independently hydrogen, alkyl branched or linear alkyl chains with 1 to 30, or 4 to 24, or 6 to 20, or 10 to 16 carbon atoms. $R^{28}$, $R^{29}$ and $R^{30}$ are independently hydrogen, alkyl branched or linear alkyl chains, or at least one, or two of $R^{28}$, $R^{29}$ and $R^{30}$ are hydrogen.

Examples of alkyl groups suitable for $R^{28}$, $R^{29}$ and $R^{30}$ include butyl, sec butyl, isobutyl, tert-butyl, pentyl, n-hexyl, sec hexyl, n-octyl, 2-ethyl, hexyl, decyl, undecyl, dodecyl, tridecyl, tetradecyl, pentadecyl, hexadecyl, heptadecyl, octadecyl, octadecenyl, nonadecyl, eicosyl or mixtures thereof.

In one embodiment the hydrocarbyl amine salt of an alkylphosphoric acid is the reaction product of a $C_{14}$ to $C_{18}$ alkylated phosphoric acid with Primene® 81R (produced and sold by Rohm & Haas) which is a mixture of $C_{11}$ to $C_{14}$ tertiary alkyl primary amines.

Hydrocarbyl amine salts of dialkyldithiophosphoric acid may include a rust inhibitor such as a hydrocarbyl amine salt of dialkyldithiophosphoric acid. These may be a reaction product of heptyl or octyl or nonyl dithiophosphoric acids with ethylene diamine, morpholine or Primene® 81R or mixtures thereof.

The hydrocarbyl amine salts of hydrocarbyl aryl sulfonic acid may include ethylene diamine salt of dinonyl naphthalene sulfonic acid.

Examples of suitable fatty carboxylic acids or esters thereof include glycerol monooleate and oleic acid. An example of a suitable ester of a nitrogen-containing carboxylic acid includes oleyl sarcosine.

The rust inhibitors may be present in the range from 0 or 0.02 wt % to 0.2 wt %, from 0.03 wt % to 0.15 wt %, from 0.04 wt % to 0.12 wt %, or from 0.05 wt % to 0.1 wt % of the lubricating oil composition. The rust inhibitors may be used alone or in mixtures thereof.

The lubricant may contain a metal deactivator, or mixtures thereof. Metal deactivators may be chosen from a derivative of benzotriazole (typically tolyltriazole), 1,2,4-triazole, benzimidazole, 2-alkyl dithiobenzimidazole or 2-alkyldithiobenzothiazole, 1-amino-2-propanol, a derivative of dimercaptothiadiazole, octylamine octanoate, condensation products of dodecenyl succinic acid or anhydride and/or a fatty acid such as oleic acid with a polyamine. The metal deactivators may also be described as corrosion inhibitors.

The metal deactivators may be present in the range from 0 or 0.001 wt % to 0.1 wt %, from 0.01 wt % to 0.04 wt % or from 0.015 wt % to 0.03 wt % of the lubricating oil composition. Metal deactivators may also be present in the composition from 0.002 wt % or 0.004 wt % to 0.02 wt %. The metal deactivator may be used alone or mixtures thereof.

In one embodiment the invention provides a lubricant composition further comprises a metal-containing detergent. The metal-containing detergent may be a calcium or magnesium detergent. The metal-containing detergent may also be an overbased detergent with total base number ranges from 30 to 500 mg KOH/g Equivalents.

The metal-containing detergent may be chosen from non-sulfur containing phenates, sulfur containing phenates, sulfonates, salixarates, salicylates, and mixtures thereof, or borated equivalents thereof. The metal-containing detergent may be may be chosen from non-sulfur containing phenates, sulfur containing phenates, sulfonates, and mixtures thereof. The detergent may be borated with a borating agent such as boric acid such as a borated overbased calcium or magnesium sulfonate detergent, or mixtures thereof. The detergent may be present at 0 wt % to 5 wt %, or 0.001 wt % to 1.5 wt %, or 0.005 wt % to 1 wt %, or 0.01 wt % to 0.5 wt % of the hydraulic composition.

The lubricant may comprise an extreme pressure agent. The extreme pressure agent may be a compound containing sulfur and/or phosphorus. Examples of extreme pressure agents include polysulfides, sulfurized olefins, thiadiazoles, or mixtures thereof.

Examples of a thiadiazole include 2,5-dimercapto-1,3,4-thiadiazole, or oligomers thereof, a hydrocarbyl-substituted 2,5-dimercapto-1,3,4-thiadiazole, a hydrocarbylthio-substituted 2,5-dimercapto-1,3,4-thiadiazole, or oligomers thereof. The oligomers of hydrocarbyl-substituted 2,5-dimercapto-1,3,4-thiadiazole typically form by forming a sulfur-sulfur bond between 2,5-dimercapto-1,3,4-thiadiazole units to form oligomers of two or more of said thiadiazole units. Examples of a suitable thiadiazole compound include at least one of a dimercaptothiadiazole, 2,5-dimercapto-[1,3,4]-thiadiazole, 3,5-dimercapto-[1,2,4]-thiadiazole, 3,4-dimercapto-[1,2,5]-thiadiazole, or 4-5-dimercapto-[1,2,3]-thiadiazole. Typically readily available materials such as 2,5-dimercapto-1,3,4-thiadiazole or a hydrocarbyl-substituted 2,5-dimercapto-1,3,4-thiadiazole or a hydrocarbylthio-substituted 2,5-dimercapto-1,3,4-thiadiazole are commonly utilized. In different embodiments the number of carbon atoms on the hydrocarbyl-substituent group includes 1 to 30, 2 to 25, 4 to 20, 6 to 16, or 8 to 10. The 2,5-dimercapto-1,3,4-thiadiazole may be 2,5-dioctyl dithio-1,3,4-thiadiazole, or 2,5-dinonyl dithio-1,3,4-thiadiazole.

The polysulfide may include a sulfurized organic polysulfide from oils, fatty acids or esters, olefins, or polyolefins.

Oils which may be sulfurized include natural or synthetic oils such as mineral oils, lard oil, carboxylate esters derived from aliphatic alcohols and fatty acids or aliphatic carboxylic acids (e.g., myristyl oleate and oleyl oleate), and synthetic unsaturated esters or glycerides.

Fatty acids include those that contain 8 to 30, or 12 to 24 carbon atoms. Examples of fatty acids include oleic, linoleic, linolenic, and tall oil. Sulfurized fatty acid esters prepared from mixed unsaturated fatty acid esters such as are obtained from animal fats and vegetable oils, including tall oil, linseed oil, soybean oil, rapeseed oil, and fish oil.

The polysulfide includes olefins derived from a wide range of alkenes. The alkenes typically have one or more double bonds. The olefins in one embodiment contain 3 to 30 carbon atoms. In other embodiments, olefins contain 3 to 16, or 3 to 9 carbon atoms. In one embodiment the sulfurized olefin includes an olefin derived from propylene, isobutylene, pentene or mixtures thereof. In one embodiment the polysulfide comprises a polyolefin derived from polymerizing by known techniques an olefin as described above. In one embodiment the polysulfide includes dibutyl tetrasulfide, sulfurized methyl ester of oleic acid, sulfurized alkylphenol, sulfurized dipentene, sulfurized dicyclopentadiene, sulfurized terpene, and sulfurized Diels-Alder adducts.

The extreme pressure agent may be present at 0 wt % to 3 wt %, 0.005 wt % to 2 wt %, 0.01 wt % to 1.0 wt % of the hydraulics composition.

The lubricant may further comprise a viscosity modifier, or mixtures thereof. Viscosity modifiers (often referred to as viscosity index improvers) suitable for use in the invention include polymeric materials including a styrene-butadiene rubber, an olefin co-polymer, a hydrogenated styrene-isoprene polymer, a hydrogenated radical isoprene polymer, a poly(meth)acrylic acid ester, a polyalkylstyrene, an hydrogenated alkenylaryl conjugated-diene copolymer, an ester of maleic anhydride-styrene copolymer or mixtures thereof. In some embodiments the viscosity modifier is a poly(meth) acrylic acid ester, an olefin copolymer or mixtures thereof. The viscosity modifiers may be present at 0 wt % to 10 wt %, 0.5 wt % to 8 wt %, 1 wt % to 6 wt % of the lubricant.

In one embodiment the lubricant disclosed herein may contain at least one friction modifier. The friction modifier may be present at 0 wt % to 3 wt %, or 0.02 wt % to 2 wt %, or 0.05 wt % to 1 wt %, of the lubricant composition.

As used herein the term "fatty alkyl" or "fatty" in relation to friction modifiers means a carbon chain having 10 to 22 carbon atoms, typically a straight carbon chain. Alternatively, the fatty alkyl may be a mono branched alkyl group, with branching typically at the β-position. Examples of mono branched alkyl groups include 2-ethylhexyl, 2-propylheptyl or 2-octyldodecyl.

Examples of suitable friction modifiers include long chain fatty acid derivatives of amines, fatty esters, or fatty epoxides; fatty imidazolines such as condensation products of carboxylic acids and polyalkylene-polyamines; amine salts of alkylphosphoric acids; fatty phosphonates; fatty phosphites; borated phospholipids, borated fatty epoxides; glycerol esters; borated glycerol esters; fatty amines; alkoxylated fatty amines; borated alkoxylated fatty amines; hydroxyl and polyhydroxy fatty amines including tertiary hydroxy fatty amines; hydroxy alkyl amides; metal salts of fatty acids; metal salts of alkyl salicylates; fatty oxazolines; fatty ethoxylated alcohols; condensation products of carboxylic acids and polyalkylene polyamines; or reaction products from fatty carboxylic acids with guanidine, aminoguanidine, urea, or thiourea and salts thereof.

In one embodiment the lubricant composition further includes an anti-wear agent. Typically the anti-wear agent may be a phosphorus anti-wear agent or mixtures thereof. The anti-wear agent may be present at 0 wt % to 5 wt %, 0.001 wt % to 2 wt %, 0.01 wt % to 1.0 wt % of the lubricant.

The phosphorus anti-wear agent may include a phosphorus amine salt, or mixtures thereof. The phosphorus amine salt includes an amine salt of a phosphorus acid ester or mixtures thereof. The amine salt of a phosphorus acid ester includes phosphoric acid esters and amine salts thereof; dialkyldithiophosphoric acid esters and amine salts thereof; phosphites; and amine salts of phosphorus-containing carboxylic esters, ethers, and amides; hydroxy substituted di or tri esters of phosphoric or thiophosphoric acid and amine salts thereof; phosphorylated hydroxy substituted di or tri esters of phosphoric or thiophosphoric acid and amine salts thereof; and mixtures thereof. The amine salt of a phosphorus acid ester may be used alone or in combination.

In one embodiment the oil soluble phosphorus amine salt includes partial amine salt-partial metal salt compounds or mixtures thereof. In one embodiment the phosphorus compound further includes a sulfur atom in the molecule.

Examples of the anti-wear agent may include a non-ionic phosphorus compound (typically compounds having phosphorus atoms with an oxidation state of +3 or +5). In one embodiment the amine salt of the phosphorus compound may be ashless, i.e., metal-free (prior to being mixed with other components).

The amines which may be suitable for use as the amine salt include primary amines, secondary amines, tertiary amines, and mixtures thereof. The amines include those with at least one hydrocarbyl group, or, in certain embodiments, two or three hydrocarbyl groups. The hydrocarbyl groups may contain 2 to 30 carbon atoms, or in other embodiments 8 to 26, or 10 to 20, or 13 to 19 carbon atoms.

Primary amines include ethylamine, propylamine, butylamine, 2-ethylhexylamine, octylamine, and dodecylamine, as well as such fatty amines as n-octylamine, n-decylamine, n-dodecylamine, n-tetradecylamine, n-hexadecylamine, n-octadecylamine and oleyamine. Other useful fatty amines include commercially available fatty amines such as "Armeen®" amines (products available from Akzo Chemicals, Chicago, Ill.), such as Armeen C, Armeen O, Armeen OL, Armeen T, Armeen HT, Armeen S and Armeen SD, wherein the letter designation relates to the fatty group, such as coco, oleyl, tallow, or stearyl groups.

Examples of suitable secondary amines include dimethylamine, diethylamine, dipropylamine, dibutylamine, diamylamine, dihexylamine, diheptylamine, methylethylamine, ethylbutylamine and ethylamylamine. The secondary amines may be cyclic amines such as piperidine, piperazine and morpholine.

The amine may also be a tertiary-aliphatic primary amine. The aliphatic group in this case may be an alkyl group containing 2 to 30, or 6 to 26, or 8 to 24 carbon atoms. Tertiary alkyl amines include monoamines such as tert-butylamine, tert-hexylamine, 1-methyl-1-amino-cyclohexane, tert-octylamine, tert-decylamine, tertdodecylamine, tert-tetradecylamine, tert-hexadecylamine, tert-octadecylamine, tert-tetracosanylamine, and tert-octacosanylamine.

In one embodiment the phosphorus acid amine salt includes an amine with C11 to C14 tertiary alkyl primary groups or mixtures thereof. In one embodiment the phosphorus acid amine salt includes an amine with C14 to C18 tertiary alkyl primary amines or mixtures thereof. In one embodiment the phosphorus acid amine salt includes an amine with C18 to C22 tertiary alkyl primary amines or mixtures thereof. Mixtures of amines may also be used. In one embodiment a useful mixture of amines is "Primene® 81R" and "Primene® JMT." Primene® 81R and Primene® JMT (both produced and sold by Rohm & Haas) are mixtures of C11 to C14 tertiary alkyl primary amines and C18 to C22 tertiary alkyl primary amines respectively.

In one embodiment oil soluble amine salts of phosphorus compounds include a sulfur-free amine salt of a phosphorus-containing compound may be obtained/obtainable by a process comprising: reacting an amine with either (i) a hydroxy-substituted di-ester of phosphoric acid, or (ii) a phosphorylated hydroxy-substituted di- or tri-ester of phosphoric acid. A more detailed description of compounds of this type is disclosed in U.S. Pat. No. 8,361,941.

In one embodiment the hydrocarbyl amine salt of an alkylphosphoric acid ester is the reaction product of a C14 to C18 alkylated phosphoric acid with Primene 81R® (produced and sold by Rohm & Haas) which is a mixture of C11 to C14 tertiary alkyl primary amines.

Examples of hydrocarbyl amine salts of dialkyldithiophosphoric acid esters include the reaction product(s) of isopropyl, methyl-amyl (4-methyl-2-pentyl or mixtures thereof), 2-ethylhexyl, heptyl, octyl or nonyl dithiophosphoric acids with ethylene diamine, morpholine, or Primene 81R™, and mixtures thereof.

In one embodiment the dithiophosphoric acid may be reacted with an epoxide or a glycol. This reaction product is further reacted with a phosphorus acid, anhydride, or lower ester. The epoxide includes an aliphatic epoxide or a styrene oxide. Examples of useful epoxides include ethylene oxide, propylene oxide, butene oxide, octene oxide, dodecene oxide, and styrene oxide. In one embodiment the epoxide may be propylene oxide. The glycols may be aliphatic glycols having from 1 to 12, or from 2 to 6, or 2 to 3 carbon atoms. The dithiophosphoric acids, glycols, epoxides, inorganic phosphorus reagents, and methods of reacting the same are described in U.S. Pat. Nos. 3,197,405 and 3,544,465. The resulting acids may then be salted with amines. An example of suitable dithiophosphoric acid is prepared by adding phosphorus pentoxide (about 64 grams) at 58° C. over a period of 45 minutes to 514 grams of hydroxypropyl O,O-di(4-methyl-2-pentyl)phosphorodithioate (prepared by reacting di(4-methyl-2-pentyl)-phosphorodithioic acid with 1.3 moles of propylene oxide at 25° C.). The mixture may be heated at 75° C. for 2.5 hours, mixed with a diatomaceous earth and filtered at 70° C. The filtrate contains 11.8% by weight phosphorus, 15.2% by weight sulfur, and an acid number of 87 (bromophenol blue).

In one embodiment the anti-wear additives may include a zinc dialkyldithiophosphate. In other embodiments the compositions of the present invention are substantially free of, or even completely free of zinc dialkyldithiophosphate.

A hydraulic lubricant may thus comprise:

0.01 wt % to 1.5 wt % of a quaternary ammonium salt, 0.0001 wt % to 0.15 wt % of a corrosion inhibitor chosen from 2,5-bis(tert-dodecyldithio)-1,3,4-thiadiazole, tolyltriazole, or mixtures thereof, an oil of lubricating viscosity, 0.02 wt % to 3 wt % of antioxidant chosen from aminic or phenolic antioxidants, or mixtures thereof, 0.005 wt % to 1.5 wt % of a borated succinimide or a non-borated succinimide dispersant, 0.001 wt % to 1.5 wt % of a neutral of slightly overbased calcium naphthalene sulfonate (typically a neutral or slightly overbased calcium dinonyl naphthalene sulfonate), and 0.001 wt % to 2 wt %, or 0.01 wt % to 1 wt % of an anti-wear agent chosen from zinc dialkyldithiophosphate, zinc dialkylphosphate, amine salt of a phosphoric acid ester, or mixtures thereof.

A hydraulic lubricant may also comprise a formulation defined in the following table:

TABLE 3

Hydraulic Lubricant compositions

| Additive | Embodiments (wt %) | | |
|---|---|---|---|
| | A | B | C |
| Seal Swell Agent of the invention (compound of formula (I)) | 0.01 to 2.0 | 0.01 to 1.5 | 0.01 to 1.0 |
| Antioxidant | 0 to 4.0 | 0.02 to 3.0 | 0.03 to 1.5 |
| Dispersant | 0 to 2.0 | 0.005 to 1.5 | 0.01 to 1.0 |
| Detergent | 0 to 5.0 | 0.001 to 1.5 | 0.005 to 1.0 |
| Anti-wear Agent | 0 to 5.0 | 0.001 to 2 | 0.1 to 1.0 |
| Friction Modifier | 0 to 3.0 | 0.02 to 2 | 0.05 to 1.0 |
| Viscosity Modifier | 0 to 10.0 | 0.5 to 8.0 | 1.0 to 6.0 |
| Any Other Performance Additive (antifoam/demulsifier/pour point depressant) | 0 to 1.3 | 0.00075 to 0.5 | 0.001 to 0.4 |
| Metal Deactivator | 0 to 0.1 | 0.01 to 0.04 | 0.015 to 0.03 |
| Rust Inhibitor | 0 to 0.2 | 0.03 to 0.15 | 0.04 to 0.12 |
| Extreme Pressure Agent | 0 to 3.0 | 0.005 to 2 | 0.01 to 1.0 |
| Oil of Lubricating Viscosity | Balance to 100% | Balance to 100% | Balance to 100% |

In one embodiment the invention provides for a composition that includes a dithiocarbamate antiwear agent defined in U.S. Pat. No. 4,758,362 column 2, line 35 to column 6, line 11. When present the dithiocarbamate antiwear agent may be present from 0.25 wt %, 0.3 wt %, 0.4 wt % or even 0.5 wt % up to 0.75 wt %, 0.7 wt %, 0.6 wt % or even 0.55 wt % in the overall composition.

A hydraulic lubricant may thus comprise:

0.01 wt % to 2 wt % of a quaternary ammonium salt, 0.0001 wt % to 0.15 wt % of a corrosion inhibitor chosen from 2,5-bis(tert-dodecyldithio)-1,3,4-thiadiazole, tolyltriazole, or mixtures thereof, an oil of lubricating viscosity, 0.02 wt % to 3 wt % of antioxidant chosen from aminic or phenolic antioxidants, or mixtures thereof, 0 wt % to 1.5 wt % of a borated succinimide or a non-borated succinimide dispersant, 0.001 wt % to 1.5 wt % of a neutral of slightly overbased calcium naphthalene sulfonate (typically a neutral or slightly overbased calcium dinonyl naphthalene sulfonate), and 0.001 wt % to 2 wt %, or 0.01 wt % to 1 wt % of an anti-wear agent chosen from zinc dialkyldithiophosphate, zinc dialkylphosphate, amine salt of a phosphoric acid ester, or mixtures thereof.

Specific examples of a hydraulic lubricant include those summarized in the following table:

TABLE 4

Hydraulic Lubricant compositions

| Additive | Embodiments (wt %) | | |
|---|---|---|---|
| | A | B | C |
| Seal Swell Agent of the invention (compound of formula (I)) | 0.2 | 0.25 | 0.5 |
| Antioxidant- aminic/phenolic | 0.4 | 0.4 | 0.4 |
| Calcium Sulfonate Detergent | 0.2 | 0.2 | 0.2 |
| Zinc dialkyl dithiophosphate | 0.3 | 0.15 | 0 |
| Any Other Performance Additive (antifoam/demulsifier/pour point depressant) | 0.01 | 0.01 | 0.01 |
| Triazole Metal Deactivator | 0.005 | 0.005 | 0.005 |
| Oil of Lubricating Viscosity | Balance to 100% | Balance to 100% | Balance to 100% |

Seal swelling performance of the hydraulic lubricant compositions may be evaluated in accordance with ASTM D471-12a: Standard Test Method for Rubber Property—Effect of Liquids.

As used herein, the term "condensation product" is intended to encompass esters, amides, imides and other such materials that may be prepared by a condensation reaction of an acid or a reactive equivalent of an acid (e.g., an acid halide, anhydride, or ester) with an alcohol or amine, irrespective of whether a condensation reaction is actually performed to lead directly to the product. Thus, for example, a particular ester may be prepared by a transesterification reaction rather than directly by a condensation reaction. The resulting product is still considered a condensation product.

The amount of each chemical component described is presented exclusive of any solvent or diluent oil, which may be customarily present in the commercial material, that is, on an active chemical basis, unless otherwise indicated. However, unless otherwise indicated, each chemical or composition referred to herein should be interpreted as being a commercial grade material which may contain the isomers, by-products, derivatives, and other such materials which are normally understood to be present in the commercial grade.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include:

hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form a ring);

substituted hydrocarbon substituents, that is, substituents containing non-hydrocarbon groups which, in the context of this invention, do not alter the predominantly hydrocarbon nature of the substituent (e.g., halo (especially chloro and fluoro), hydroxy, alkoxy, mercapto, alkylmercapto, nitro, nitroso, and sulfoxy);

hetero substituents, that is, substituents which, while having a predominantly hydrocarbon character, in the context of this invention, contain other than carbon in a ring or chain otherwise composed of carbon atoms and encompass substituents as pyridyl, furyl, thienyl and imidazolyl. Heteroatoms include sulfur, oxygen, and nitrogen. In general, no more than two, or no more than one, non-hydrocarbon substituent will be present for every ten carbon atoms in the hydrocarbyl group; alternatively, there may be no non-hydrocarbon substituents in the hydrocarbyl group.

It is known that some of the materials described above may interact in the final formulation, so that the components of the final formulation may be different from those that are initially added. For instance, metal ions (of, e.g., a detergent) can migrate to other acidic or anionic sites of other molecules. The products formed thereby, including the products formed upon employing the composition of the present invention in its intended use, may not be susceptible of easy description. Nevertheless, all such modifications and reaction products are included within the scope of the present invention; the present invention encompasses the composition prepared by admixing the components described above.

The invention herein is useful for providing improved water separation in coating compositions for preventing rust on metal surfaces. Surprisingly, the improved water separation can be attained with no negative effects on salt spray performance, which may be better understood with reference to the following examples.

EXAMPLES

Sample 1

A 1000 Mw polyisobutylene succinimide of dimethylaminopropyl amine (250 g, 0.231 mol), methyl salicylate (52.68 g, 0.347 mol) and 2-ethylhexanol (417.9 g, 58 wt %) was charged to a 1 L flange flask equipped with an overhead stirrer, thermocouple with eurotherm heating, nitrogen sweep and condenser. The reaction was heated slowly with agitation (200 rpm) to 140° C. The reaction was held at temperature overnight (around 18 h). The resulting material, a quaternised polyisobutylenesuccinimide believed to have the structure below was cooled and collected.

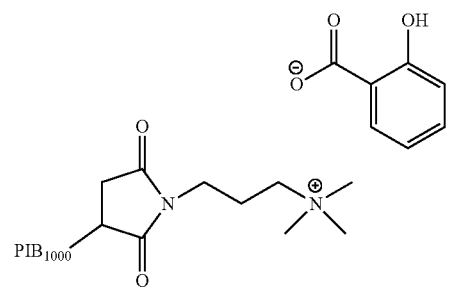

Sample 2

2300 Mn polyisobutylene succinic anhydride, made via the alder-ene reaction of polyisobutylene with maleic anhydride, theoretical acid number 43 mg KOH/g (1000 g, CO:N 1:1) was charged to a 2 L flange flask, equipped with a mechanical stirrer, thermocouple with eurotherm heating, nitrogen sweep, dean stark topped with a condenser. The reaction was heated to 95° C. with agitation (~250 rpm). N'N-dimethylaminopropylamine (37.14 g CO:N 1:1) was charged subsurface dropwise to the reaction over 17 mins. Upon completion of the addition, the reaction was heated to 150° C. and held for 4 h with a subsurface nitrogen sparge. During the hold water was collected in the dean stark trap. The resultant material, a polyisobutylenesuccinimide believed to have the structure below was cooled and collected.

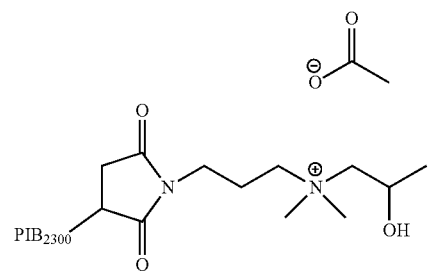

Sample 3

Polyisobutylenesuccinimide (479.3 g 0.43 mol) and 2-ethylhexanol (194.7 g, 26 wt %) were charged to a 1 L flange flask equipped with an overhead stirrer, thermocouple with eurotherm heating, nitrogen sweep, condenser and subaseal (with syringe pump). The reaction was heated to 75° C. with agitation (210 rpm. Acetic acid (25.57 g, 0.43 mol) and water (4.79 g, 1 wt %) were charged to the flask), and held for 30 minutes to homogenise. Propylene oxide (44.52 g, 0.774 mol) was added subsurface via syringe pump over 2 h (rate: 13.41 ml/hr). During the addition the stir rate was increased to 476 rpm. Upon completion of the addition, the reaction was held for a further 3 h. The resulting material, a quaternised polyisobutylenesuccinimide believed to have the structure below was cooled and collected.

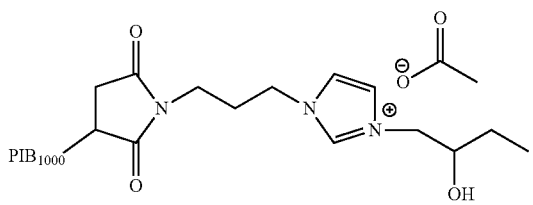

Sample 4

1000 Mw polyisobutylene succinic anhydride, prepared by reacting 1 mole 1000 number average molecular weight high vinylidene polyisobutylene and 1.2 moles maleic anhydride in a thermal "ene" reaction (2000 g, 2.134 mol) and heptane (384.6 g, 15 wt %) were charged to a 5 L flange flask equipped with an overhead stirrer, thermocouple with eurotherm heating, dean stark trap topped with a condenser, a nitrogen sweep and a dropping funnel with subsurface addition. The reaction was heated to 70 C with agitation (120 rpm.) Once at temperature, dimethylaminopropylamine (218.5 g, 2.134 mol) was charged dropwise over 110 minutes. Note—the addition was varied so that the temperature did not exceed 80 C. During the addition the stir rate was increased to 170 rpm. Upon completion of the addition, the reaction was held at 70 C for 3 h. The resulting material, a polyisobutenylsuccinamide-acid believed to have the structure below was cooled and collected.

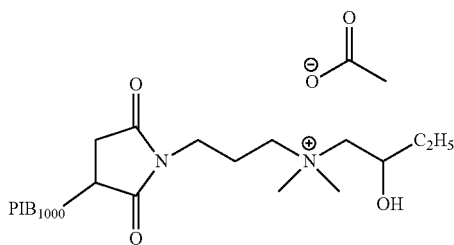

Sample 5

On a reaction plant, polyisobutylene succinic anhydride (100% actives, 100 parts by weight (pbw)), was heated to 80° C. and was charged to a jacketed reaction vessel fitted with stirrer, condenser, feed pump attached to subline addition pipe, nitrogen line and mantle/thermocouple/temperature controller system. The reaction vessel was heated to 100° C., where dimethylaminopropylamine (10.93 pbw) was charged to the reaction, maintaining the batch temperature below 120° C. The reaction mixture was then heated to 150° C. and held for 3 hours. The resulting product, a non-quaternized succinimide detergent, was cooled and collected. This material was then heated to 75° C. and was charged to a jacketed reaction vessel fitted with stirrer, condenser, feed pump attached to subline addition pipe, nitrogen line and mantle/thermocouple/temperature controller system. 2-ethyl hexanol (40.55 pbw), water (1 pbw) and acetic acid (5.88 pbw) were charged to the vessel and held for 3 hours. Propylene oxide (8.54 pbw) was then charged via a subsurface sparge ring, and the reaction held at 75° C. for 6 hours. The resulting product, a quaternised succinimide believed to have the structure below was cooled and collected.

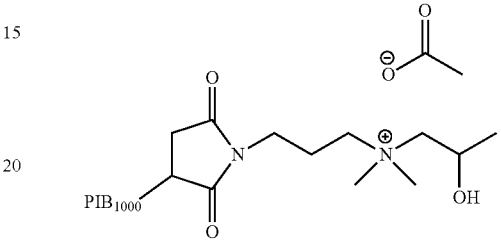

Example 1

Samples 1 to 5 were added to a soy derived natural wax rust preventative ("Soy") and an oxidized petroleum wax based rust preventative ("Petroleum") in concentrations ranging from 0.1 to 1%. These blends were then diluted in mineral spirits, and water separation testing was performed by preparing a concentrate treated with 0.1, 0.5 and 1% of the quaternary ammonium salt, diluting the concentrate to 20% in solvent, and then mixing 75 mL of the dilution with 25 mL of distilled water by inverting the dilution six times. The time in which it takes the rust preventive to separate the 25 mL of water was observed.

Table 1 shows the results of this initial testing.

TABLE 1

Initial Water Separation Testing For Five Quaternary Amines

| Rust Preventive (20% in D 40) | Quat Additive | Additive Concentration | Water Separation Time (minutes) |
|---|---|---|---|
| Soy | None | NA | 21:47 |
|  | Sample 1 | 0.1% | 7:18 |
|  |  | 0.5% | 7:05 |
|  |  | 1.0% | 7:06 |
|  | Sample 2 | 0.1% | 8:10 |
|  |  | 0.5% | 7:44 |
|  |  | 1.0% | 8:06 |
|  | Sample 4 | 0.1% | 8:19 |
|  |  | 0.5% | 9:04 |
|  |  | 1.0% | 12:05 |
|  | Sample 3 | 0.1% | 7:44 |
|  |  | 0.5% | 8:30 |
|  |  | 1.0% | 9:25 |
|  | Sample 5 | 0.1% | 5:54 |
| Petroleum | None | NA | 17:26 |
|  | Sample 1 | 0.1% | 11:28 |
|  |  | 0.5% | 12:10 |
|  |  | 1.0% | 12:57 |
|  | Sample 2 | 0.1% | 15:02 |
|  |  | 0.5% | 12:16 |
|  |  | 1.0% | 13:20 |
|  | Sample 4 | 0.1% | 11:30 |
|  |  | 0.5% | 11:03 |
|  |  | 1.0% | 9:40 |

TABLE 1-continued

Initial Water Separation Testing For Five Quaternary Amines

| Rust Preventive (20% in D 40) | Quat Additive | Additive Concentration | Water Separation Time (minutes) |
|---|---|---|---|
| | Sample 3 | 0.1% | 13:28 |
| | | 0.5% | 10:19 |
| | | 1.0% | 11:58 |

Both RPs, when treated with quaternary amines, gave improved water separation over untreated RPs for all additives at all concentrations tested. For the natural wax blend soy, adding as little as 0.1% of a quat additive decreased the time needed for water separation from over 21 minutes to roughly 8 minutes. Similarly, untreated Petroleum took roughly 17 minutes to separate water; this time was improved to less than 10 minutes for the best-performing quat additive (Sample 4).

These positive results suggested that adding small amounts of quat additives to soy derived natural wax and oxidized petroleum wax based could yield rust preventives with better water separation; however, the effects of the quaternary amines on salt spray protection needed to be tested before further work. Salt spray testing on the Soy blend as well as a coconut derived natural wax rust preventative (1:2 partially hydrogenated coconut to partially hydrogenated soy—"Coco"). The results of water separation testing are given in Table 2.

TABLE 2

Water Separation Testing For Quaternary Amines at Lower Concentrations.

| Rust Preventive (20% in mineral spirits) | Quat Additive | Additive Concentration | Water Separation Time (minutes) |
|---|---|---|---|
| Soy | None | NA | 30:00 |
| | Sample 1 | 0.01% | 20:30 |
| | | 0.05% | 11:00 |
| | Sample 2 | 0.01% | 18:00 |
| | | 0.05% | 10:30 |
| | Sample 4 | 0.01% | 17:00 |
| | | 0.05% | 13:00 |
| | Sample 3 | 0.01% | 14:30 |
| | | 0.05% | 13:30 |
| | Sample 5 | 0.01% | 16:00 |
| | | 0.05% | 10:30 |
| Coco | None | NA | 13:00 |
| | Sample 1 | 0.01% | 12:00 |
| | | 0.05% | 12:00 |
| | Sample 2 | 0.01% | 11:30 |
| | | 0.05% | 11:30 |
| | Sample 4 | 0.01% | 10:30 |
| | | 0.05% | 12:30 |
| | Sample 3 | 0.01% | 11:00 |
| | | 0.05% | 13:30 |
| | Sample 5 | 0.01% | 10:00 |
| | | 0.05% | 9:30 |
| Petroleum | None | NA | 25:00 |
| | Sample 1 | 0.005% | 14:30 |
| | | 0.01% | 14:00 |
| | | 0.05% | 14:00 |
| | Sample 2 | 0.005% | 14:15 |
| | | 0.01% | 14:15 |
| | | 0.05% | 15:00 |
| | Sample 4 | 0.005% | 14:30 |
| | | 0.01% | 14:15 |
| | | 0.05% | 15:00 |
| | Sample 3 | 0.005% | 15:00 |
| | | 0.01% | 14:15 |
| | | 0.05% | 12:45 |
| | Sample 5 | 0.005% | 14:30 |
| | | 0.01% | 13:30 |
| | | 0.05% | 14:30 |

All five quaternary amines tested seem to have roughly the same effects on water separation for each blend. The observed water separation times of 10 to 13 minutes for the quaternary ammonium salt samples were faster than the 30 minutes needed for the untreated soy blend to separate water.

For natural wax blend coco, water separation improved with the quaternary ammonium samples from 13 minutes for untreated blend Coco to less than 10 minutes for the best-performing quaternary ammonium salt.

Similarly, for Petroleum, the quat additives reduced water separation time from 25 minutes to 14-16 minutes.

These results clearly show that the quaternary amines can improve water separation for rust preventives. The five quaternary amines show similar behavior, and offer improvements in water separation. The commercial additives are more unpredictable, with some offering dramatic improvements in water separation time and others showing no improvement over the untreated RP.

The effect of the quaternary ammonium salts on salt spray protection was assessed further. Several blends with both good salt spray performance were selected for salt spray testing. These blends were run against controls of Petroleum, Soy, and Coco with no demulsifying additives to determine whether the presence of the additive affected salt spray performance. The results are reported in Table 4.

TABLE 4

Salt Spray Testing

| Rust Preventive (20% in mineral spirits) | Demulsifying Additive | Additive Concentration | Hours in Salt Spray - 2 panels run |
|---|---|---|---|
| Soy | None | NA | 416-480; 480-488 |
| | Sample 2 | 0.05% | 392-408; 392-408 |
| | Sample 5 | 0.05% | 368-384; 392-408 |
| Coco | None | NA | 344-360; 312-320 |
| | Sample 4 | 0.01% | 344-360; 344-360 |
| | Sample 5 | 0.01% | 488-504; 416-480 |
| Petroleum | None | NA | 72-88; 72-88 |
| | Sample 2 | 0.005% | 96-112; 72-88 |
| | Sample 5 | 0.005% | 88-96; 112-120 |

The results of salt spray testing clearly show that the quaternary ammonium salts can have a negligible effect on salt spray performance for all three RPs. The untreated Soy blend lasted for over 400 hours in salt spray, while soy samples treated with demulsifying additive all lasted over 350 hours. Similarly, for the coco blend, the untreated sample and a sample treated with 0.01% Sample 4 had comparable salt spray performance, and were outperformed by a sample treated with 0.01% Sample 5. For Petroleum, none of the additives tested had a negative effect on the salt spray performance.

It is evident from this study that the quaternary amine additives are effective demulsifiers in Petroleum based and naturally derived wax-based RPs. These additives improve water separation times from 20 to 30 minutes for the untreated RPs to less than 15 minutes, and in some cases less than 10 minutes. In addition, when used in concentrations of 0.05% or lower, the additives provide improved water separation with no negative effects on salt spray performance.

Each of the documents referred to above is incorporated herein by reference, including any prior applications, whether or not specifically listed above, from which priority is claimed. The mention of any document is not an admission that such document qualifies as prior art or constitutes the general knowledge of the skilled person in any jurisdiction. Except in the Examples, or where otherwise explicitly indicated, all numerical quantities in this description specifying amounts of materials, reaction conditions, molecular weights, number of carbon atoms, and the like, are to be understood as modified by the word "about." It is to be understood that the upper and lower amount, range, and ratio limits set forth herein may be independently combined. Similarly, the ranges and amounts for each element of the invention can be used together with ranges or amounts for any of the other elements.

As used herein, the transitional term "comprising," which is synonymous with "including," "containing," or "characterized by," is inclusive or open-ended and does not exclude additional, un-recited elements or method steps. However, in each recitation of "comprising" herein, it is intended that the term also encompass, as alternative embodiments, the phrases "consisting essentially of" and "consisting of," where "consisting of" excludes any element or step not specified and "consisting essentially of" permits the inclusion of additional un-recited elements or steps that do not materially affect the essential or basic and novel characteristics of the composition or method under consideration.

While certain representative embodiments and details have been shown for the purpose of illustrating the subject invention, it will be apparent to those skilled in this art that various changes and modifications can be made therein without departing from the scope of the subject invention. In this regard, the scope of the invention is to be limited only by the following claims.

What is claimed is:
1. A coating composition comprising,
a. a rust preventative composition,
b. a quaternary ammonium salt comprising a compound of at least one of formulas XIV, XV, XVIII, XVI, XVII, and combinations thereof:

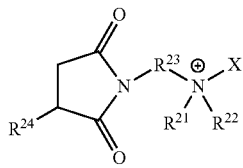

(XIV)

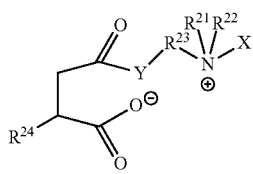

(XV)

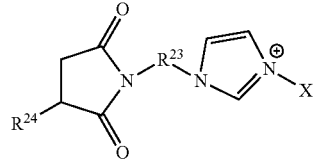

(XVIII)

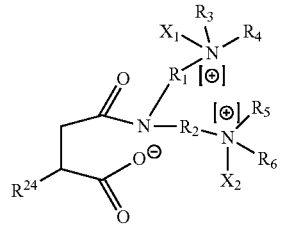

(XVI)

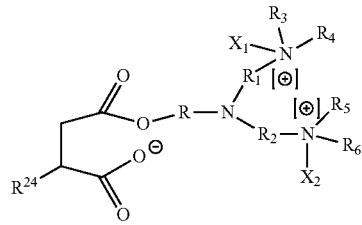

(XVII)

wherein: $R^{21}$ is a hydrocarbyl group containing from 1 to 10 carbon atoms; $R^{22}$ is a hydrocarbyl group containing from 1 to 10 carbon atoms; $R^{23}$ is a hydrocarbylene group containing from 1 to 20 carbon atoms; $R^{24}$ is a hydrocarbyl group containing from 5 to 25 carbon atoms; and X is a group derived from a quaternizing agent, R is a $C_1$ to $C_6$ alkyl group; $R_1$ and $R_2$, individually, are $C_1$ to $C_6$ hydrocarbyl groups; $R_3$, $R_4$, $R_5$ and $R_6$, individual, are hydrogen or a $C_1$ to $C_6$ hydrocarbyl group; $X_1$ and $X_2$, individually, are H or a group derived from a quaternizing agent, so long as at least one of $X_1$ and $X_2$ is a group derived from the quaternizing agent, and
c. an oil of lubricating viscosity or a volatile diluent.
2. The coating composition of claim 1, wherein the quaternizing agent is capable of coupling more than one quaternary ammonium salt.
3. The coating composition of claim 1, wherein the quaternizing agent is chosen from polyepoxides, polyhalides, epoxy halides, aromatic polyesters, and mixtures thereof.
4. The coating composition of claim 1, wherein the quaternizing agent is chosen from di-epoxides or alkyl di-halides.
5. The coating composition of claim 1, wherein the quaternizing agent is chosen from 1,4 butanediol diglycidylether or bisphenol-A-diglycidylether.
6. The coating composition of claim 1, wherein the quaternizing agent comprises at least one alcohol functionalized epoxide, $C_4$ to $C_{14}$ epoxides, or mixture thereof.
7. The coating composition of claim 6, wherein the quaternizing agent is glycidol.
8. The coating composition of claim 6, wherein the quaternizing agent is epoxyhexadecane.
9. The coating composition of claim 6, wherein the quaternizing agent comprises butylene oxide.
10. The coating composition of claim 6 wherein the quaternizing agent is employed in the presence of a protic solvent.

11. The coating composition of claim 10, wherein the protic solvent comprises 2-ethylhexanol, water, and mixtures thereof.

12. The coating composition of claim 6 wherein the quaternizing agent is employed in the presence of an acid.

13. The coating composition of claim 6, wherein the acid is present in the structure of the quaternary ammonium salt.

14. The coating composition of claim 1, wherein the quaternizing agent is chosen from dialkyl sulfates, alkyl halides, hydrocarbyl substituted carbonates, hydrocarbyl epoxides, carboxylates, alkyl esters and mixtures thereof.

15. The coating composition of claim 1, further comprising at least one other additive.

16. The coating composition of claim 15, wherein the at least one other additive comprises at least one non-quaternized hydrocarbyl-substituted succinic acid.

17. The coating composition of claim 16, wherein the hydrocarbyl-substituent is a polyisobutylene having a molecular weight of from about 100 to about 5000.

18. A method of providing rust prevention to a metal surface comprising applying to the metal surface a coating composition according to claim 1.

\* \* \* \* \*